United States Patent
Kim et al.

(10) Patent No.: US 12,540,739 B2
(45) Date of Patent: Feb. 3, 2026

(54) AIR CONDITIONER

(71) Applicant: LG ELECTRONICS INC., Seoul (KR)

(72) Inventors: Junghyeon Kim, Seoul (KR); Chanseung Park, Seoul (KR); Suhyeon Jeong, Seoul (KR); Geunyoung Park, Seoul (KR); Sooyeon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 18/118,875

(22) Filed: Mar. 8, 2023

(65) Prior Publication Data
US 2023/0288077 A1    Sep. 14, 2023

(30) Foreign Application Priority Data
Mar. 8, 2022    (KR) .................. 10-2022-0029674

(51) Int. Cl.
*F24F 1/0076*    (2019.01)
*F24F 1/0073*    (2019.01)
*F24F 8/192*    (2021.01)

(52) U.S. Cl.
CPC .......... *F24F 1/0076* (2019.02); *F24F 1/0073* (2019.02); *F24F 8/192* (2021.01)

(58) Field of Classification Search
CPC ......... F24F 1/0073; F24F 1/0076; F24F 8/192
See application file for complete search history.

(56) References Cited

U.S. PATENT DOCUMENTS

2017/0120256 A1    5/2017    Jeon et al.

FOREIGN PATENT DOCUMENTS

| CN | 104080539 | 8/2017 |
|---|---|---|
| CN | 107051724 | 8/2017 |
| CN | 209763352 | 12/2019 |
| CN | 211801652 | 10/2020 |
| CN | 212409004 | 1/2021 |
| CN | 212566168 | 2/2021 |
| EP | 3267124 | 1/2018 |
| JP | H11-94282 | 4/1999 |

(Continued)

OTHER PUBLICATIONS

Korean Office Action dated Aug. 21, 2024 issued in Application No. 10-2022-0185473.

(Continued)

*Primary Examiner* — Sharon Pregler
(74) *Attorney, Agent, or Firm* — KED & ASSOCIATES, LLP

(57) ABSTRACT

An air conditioner includes an electrostatic dust collector configured to remove foreign matter from air introduced into an inlet of a housing, wherein the electrostatic dust collector includes: at least one electrostatic filter configured to filter foreign matter from air and including a first side wall and a second side wall disposed in an opposite direction to the first side wall; a first filter handle slidingly coupled to the first side wall and detachably coupled to one side of the housing; and a second filter handle slidingly coupled to the second side wall and detachably coupled to another side of the housing, and wherein the first side wall has a structure corresponding to the second side wall.

18 Claims, 23 Drawing Sheets

(56) References Cited

FOREIGN PATENT DOCUMENTS

| | | | |
|---|---|---|---|
| JP | 2004-218990 | | 8/2004 |
| JP | 2009-034599 | | 2/2009 |
| JP | 2018-204890 | | 12/2018 |
| KR | 10-1999-0019491 | | 3/1999 |
| KR | 20-0142511 | | 6/1999 |
| KR | 10-2011-0088742 | | 8/2011 |
| KR | 10-2013-0026010 | | 3/2013 |
| KR | 10-2018-0020448 | | 2/2018 |
| KR | 20180020448 | * | 2/2018 |
| KR | 10-1942525 | | 4/2019 |
| KR | 10-2020-0111571 | | 9/2020 |
| KR | 10-2021-0076377 | | 6/2021 |
| KR | 10-2021-0129887 | | 10/2021 |
| KR | 10-2339392 | | 12/2021 |
| KR | 10-2369101 | | 2/2022 |

OTHER PUBLICATIONS

International Search Report dated Jun. 27, 2023 issued in Application No. PCT/KR2023/003076.
Extended European Search Report dated Jul. 17, 2023 issued in Application No. 23160566.8.
PCT Search Report dated Jun. 29, 2023, issued in PCT International Patent appl. No. PCT/KR2023/003072.
European Search Report dated Jul. 21, 2023, issued in European Patent appl. No. 23160468.7.
Chinese Office Action dated Jul. 30, 2025, issued in Application No. 202310214070.6.

* cited by examiner

AIR CONDITIONER

CROSS-REFERENCE TO RELATED APPLICATION

This application claims priority under 35 U.S.C. § 119 to Korean Application No. 10-2022-0029674 filed on Mar. 8, 2022, whose entire disclosure is hereby incorporated by reference.

BACKGROUND

1 Field

The present disclosure relates to an air conditioner, and more particularly, to an air conditioner installed in an indoor space.

2. Background

An air conditioner is a device that controls the temperature of an indoor space by discharging heat-exchanged air to the indoor space.

Such an air conditioner is provided in an indoor space to supply air by exchanging heat with air introduced from the outside or air circulated in the indoor space. The air conditioner provided in the indoor space may be installed on a floor surface, a wall surface, or a ceiling of the indoor space.

An electrostatic filter may be provided in the air conditioner to remove foreign matter or pollutants from air introduced into an inlet. The electrostatic filter may be molded with a material to which current is applied to thereby provide an electrical connection between a plurality of electrostatic filters spaced apart from each other.

Korean Laid-Open Patent Publication No. KR10-2018-0020448, which is hereby incorporated by reference, discloses an electrostatic filter manufactured by a molding method. However, the electrostatic filter manufactured by the molding method requires a relatively long time for the manufacturing process. In addition, a defect of the electrostatic filter that occurs after use may not be easily fixed or addressed.

BRIEF DESCRIPTION OF THE DRAWINGS

The embodiments will be described in detail with reference to the following drawings in which like reference numerals refer to like elements wherein.

DETAILED DESCRIPTION

Figure 1:
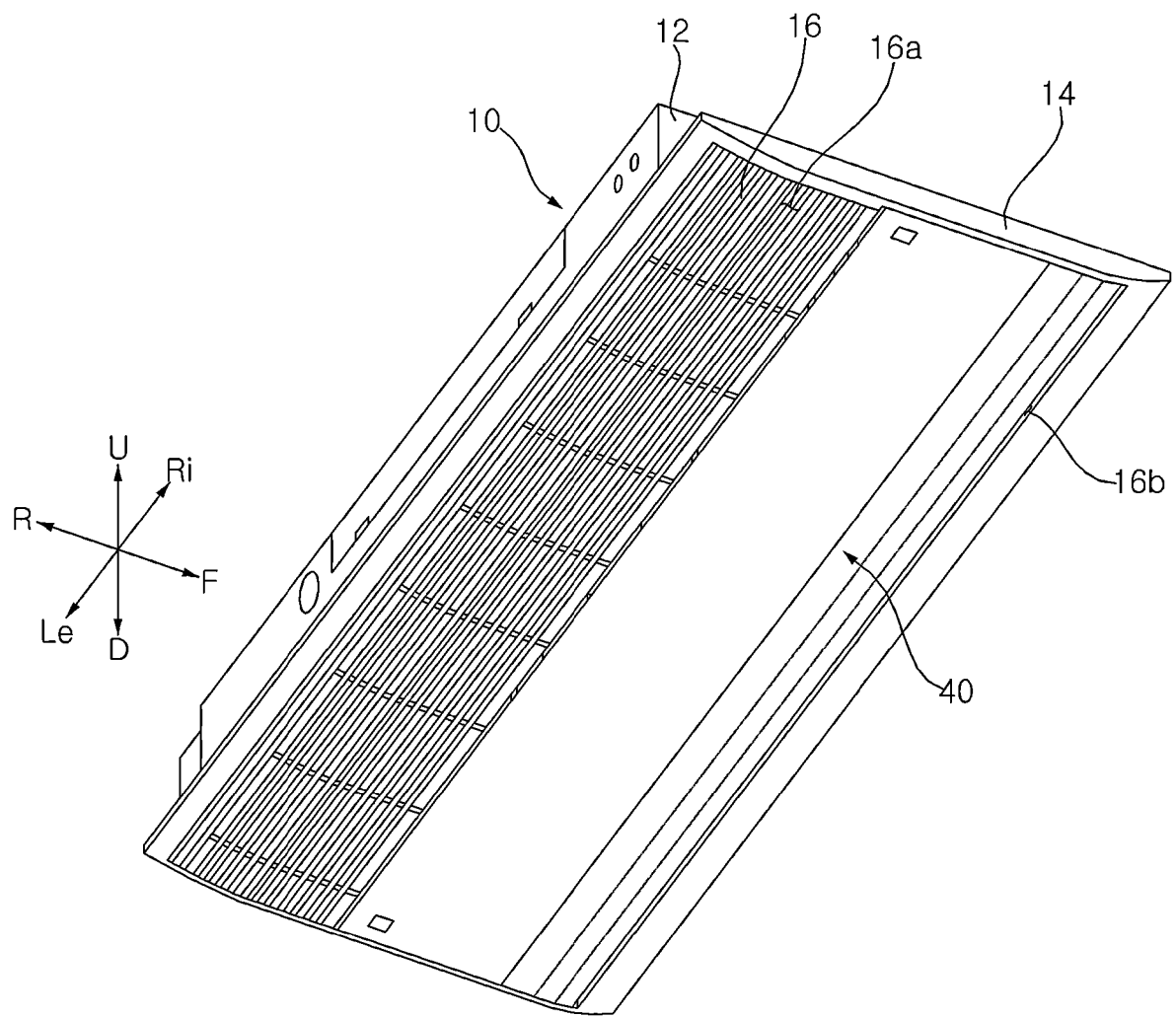
FIG. 1 is a bottom perspective view illustrating an example of an air conditioner.
Figure 2:
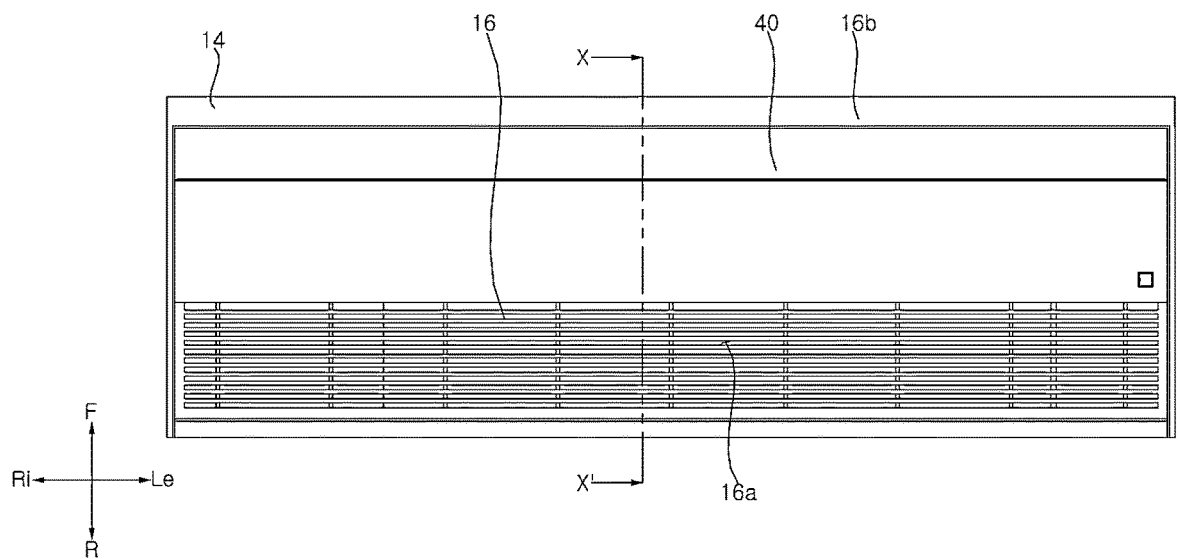
FIG. 2 is a bottom view of FIG. 1.

The above and other aspects, features and other advantages of the present disclosure will be more clearly understood from the following detailed description taken in conjunction with the accompanying drawings. Exemplary embodiments will now be described more fully hereinafter with reference to the accompanying drawings; however, they may be embodied in many different forms and should not be construed as limited to the embodiments set forth herein. Rather, these embodiments are provided so that this disclosure will be thorough and complete, and will fully convey the scope of the exemplary embodiments to those skilled in the art. The same reference numerals are used throughout the drawings to designate the same or similar components.

It will be understood that although the terms "first", "second", etc. may be used herein to describe various elements, these elements should not be limited by these terms. These terms are only used to distinguish one element from another. The directions up (U), down (D), left (Le), right (Ri), front (F), and rear (R) shown in FIGS. 1 to 3, and FIGS. 26 and 27 are for the convenience of description, and the present disclosure should not be limited by these directions. Thus, these directions may be described differently depending on the reference or origin.

Hereinafter, an air conditioner according to embodiments of the present disclosure will be described with reference to the accompanying drawings.

<Overall Configuration>

The air conditioner of the present disclosure is configured such that air sucked in is discharged through a pre-filter 34 and an electrostatic dust collector (or electrostatic precipitator) 50. Therefore, the air conditioner of the present disclosure may be an air conditioner that also functions as an air cleaner.

Figure 3:
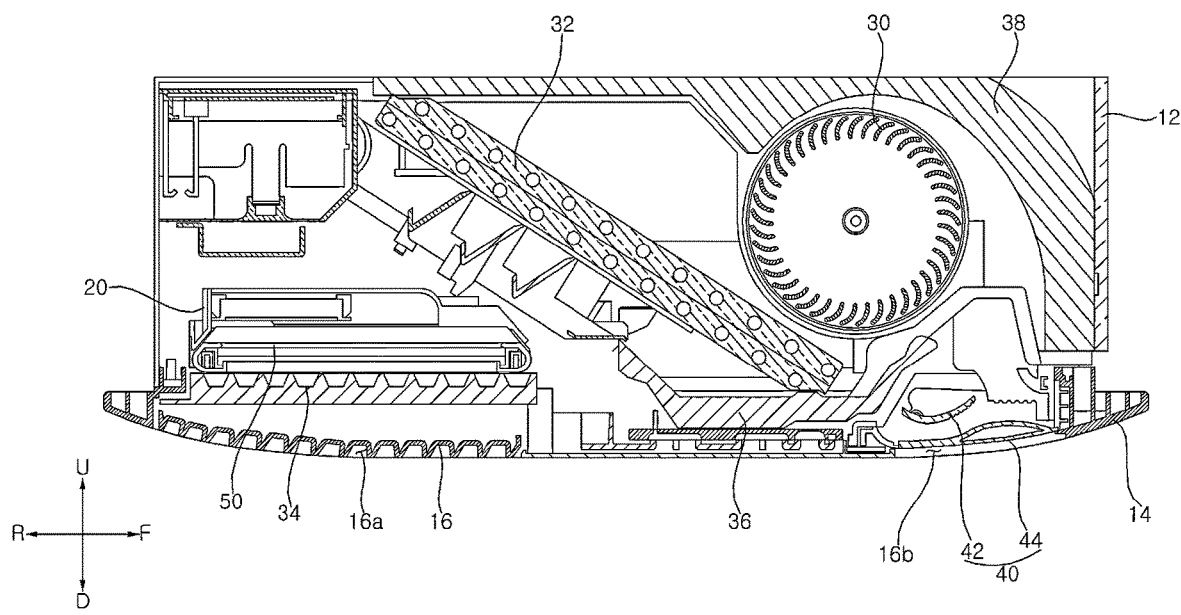
FIG. 3 is a cross-sectional view taken along the line X-X' of FIG. 2.

The air conditioner of the present disclosure may include a housing 10 having an inlet 16a and an outlet 16b, a heat exchanger 32 disposed in the housing 10, a fan 30 rotatably disposed in the housing 10, the pre-filter 34 disposed at the inlet 16a, the electrostatic dust collector 50 configured to remove foreign matter or pollutants from air that has passed through the pre-filter 34, and a vane module 40 configured to control a wind direction of air flowing to the outlet 16b. The housing 10 includes an upper housing 12 defining a space therein and a lower housing 14 disposed under the upper housing 12 and having the inlet 16a and the outlet 16b. Referring to FIG. 3, the upper housing 12 is provided with an air guider 38 configured to guide air flowing to the outlet 16b through the fan 30.

The inlet 16a of the lower housing 14 is provided with an inlet panel 16. The pre-filter 34 and the electrostatic dust collector 50 are disposed above the inlet panel 16. A filter housing 20 to which the electrostatic dust collector 50 is mounted is disposed on an upper side of the lower housing 14.

The vane module 40 may include an outer vane 42 and an inner vane 44. The outer vane 42 and the inner vane 44 may operate in conjunction with each other. The outer vane 42 and the inner vane 44 may guide air discharged from the outlet 16b in a horizontal direction or a vertical direction. The vane module 40 may be provided with a vertical vane (not shown) to guide air discharged from the outlet 16b in a left-and-right direction. The housing 10 may be provided therein with a drain pan 36 to temporarily store condensed water (condensate) generated in the heat exchanger 32.

<Electrostatic Dust Collector>

Hereinafter, the electrostatic dust collector 50 according to an embodiment of the present disclosure will be described with reference to FIGS. 4 to 29. In FIGS. 4 to 25, and FIGS. 28 and 29, description is given based on the length (or depth) direction (l+, l−), width direction (w+, w−), and height direction (h+, h−) of the electrostatic dust collector 50 (or the electrostatic filter 100).

The electrostatic dust collector 50 includes at least one electrostatic filter 100 that collects dust particles from air. The electrostatic filter 100 may have a first side wall 104 on one side thereof and a second side wall 106 disposed in an opposite direction to the first side wall 104. The first side wall 104 is provided with a first coupling protrusion 104a protruding therefrom. The second side wall 106 is provided with a second coupling recess 106b corresponding to the first coupling protrusion 104a.

The first side wall 104 is provided with a first coupling recess 104b recessed therein. The second side wall 106 is provided with a second coupling protrusion 106a having a size inserted into the first coupling recess 104b and protruding therefrom.

The first coupling protrusion 104a and the first coupling recess 104b are spaced apart from each other in a front-and-rear direction on the first side wall 104. The second coupling protrusion 106a and the second coupling recess 106b are spaced apart from each other in the front-and-rear direction on the second side wall 106. The first coupling protrusion 104a and the second coupling protrusion 106a are disposed in opposite directions with respect to the front-and-rear direction.

The first coupling protrusion 104a has a structure that is inserted into the second coupling recess 106b. The first coupling recess 104b has a structure into which the second coupling protrusion 106a is inserted.

The electrostatic filter 100 includes a button 160a, 160b to fix the electrostatic filter 100. The button 160a, 160b includes a first button protrusion 162 protruding upward from an upper surface of the electrostatic filter 100, a restoring plate 166 to restore the position of the first button protrusion 162, and a second button protrusion 164 disposed to protrude from the first coupling protrusion 104a or the second coupling protrusion 106a and configured to move together with the first button protrusion 162.

The electrostatic dust collector 50 may include at least one filter handle disposed on one side of the electrostatic filter 100 and by which the electrostatic filter 100 is fixed to the housing 10. The filter handle is connected to the electrostatic filter 100 and has a structure that is fixed to the housing 10.

In one embodiment, referring to FIGS. 4 to 7, the electrostatic dust collector 50 may include a first filter handle 200a disposed on one side of the electrostatic filter 100 and by which the electrostatic filter 100 is fixed to the housing 10, and a second filter handle 200b disposed on another (or opposite) side of the electrostatic filter 100 and by which the electrostatic filter 100 is fixed to the housing 10. The filter handle of other shapes or forms may also be used for fixing the placement or position of the electrostatic filter 100 to the housing 10. Alternatively, the electrostatic filter 100 may be directly mounted to the housing 10 without the filter handle.

The first side wall 104 of the electrostatic filter 100 has a structure that is coupled to the first filter handle 200a, and the second side wall 106 of the electrostatic filter 100 has a structure that is coupled to the second filter handle 200b. The first side wall 104 of the electrostatic filter 100 has a structure corresponding to the second side wall 106, allowing one electrostatic filter 100 to be disposed adjacent to another electrostatic filter 100. That is, a plurality of electrostatic filters 100a and 100b may be disposed between the first filter handle 200a and the second filter handle 200b.

Figure 4:
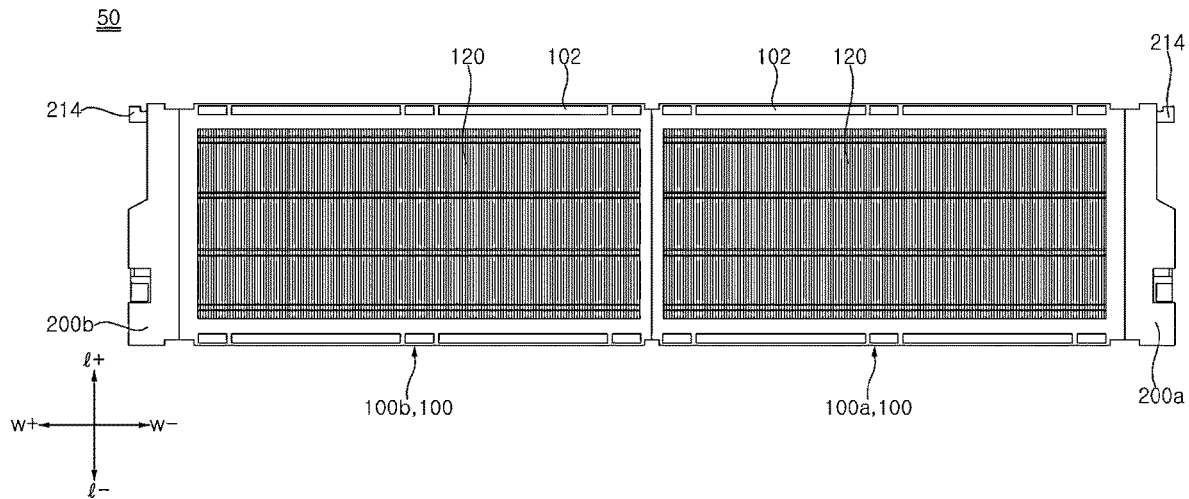
FIG. 4 is a bottom view illustrating an example of an electrostatic dust collector.
Figure 5:
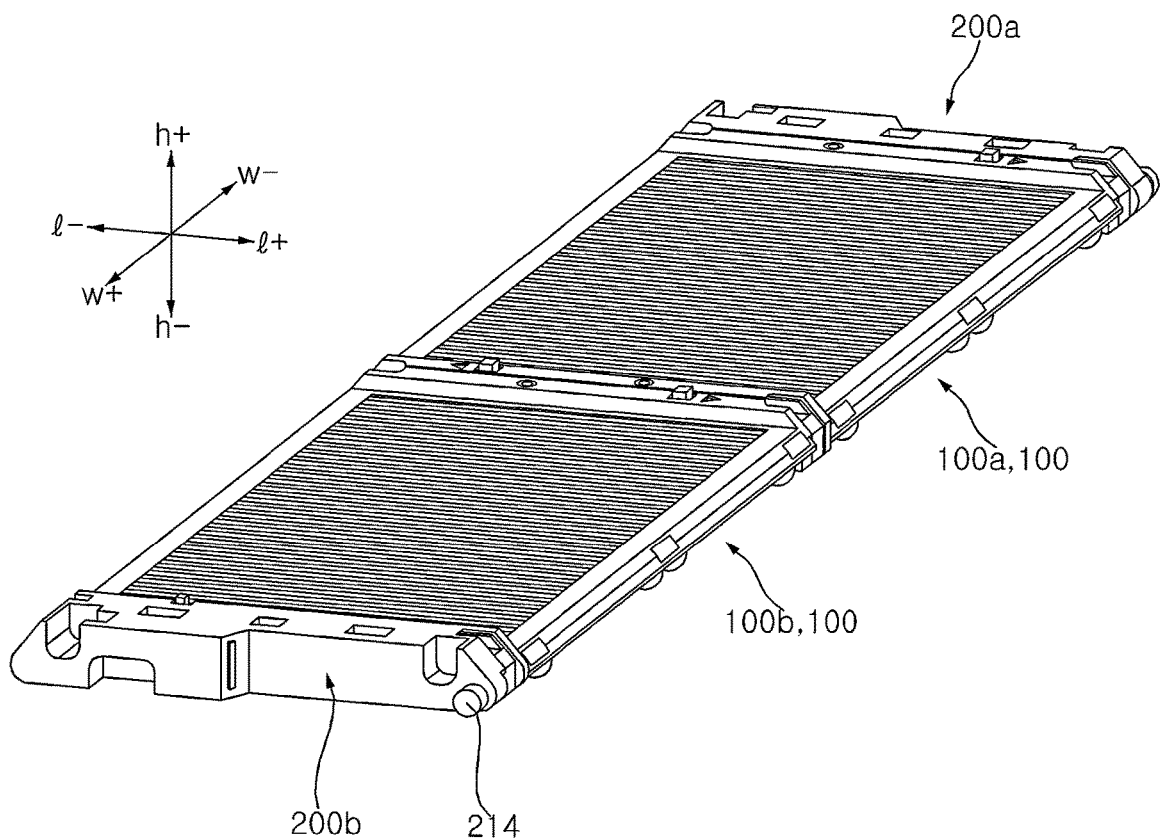
FIG. 5 is a perspective view illustrating an example of an electrostatic dust collector.
Figure 6:
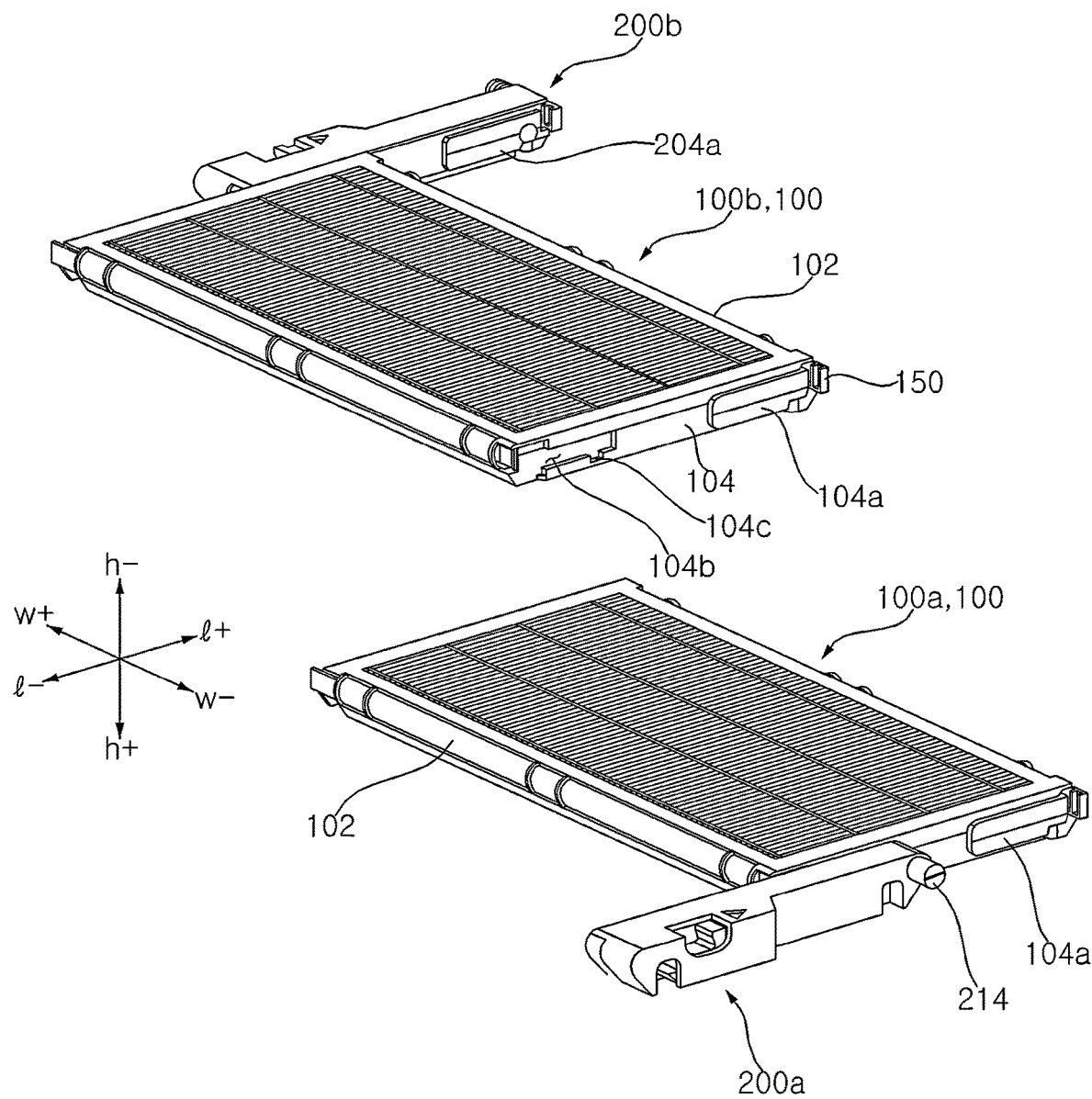
FIG. 6 is a perspective view illustrating an example of a disassembled state of an electrostatic dust collector.

Referring to FIGS. 4 to 6, a first electrostatic filter 100a and a second electrostatic filter 100b may be disposed between the first filter handle 200a and the second filter handle 200b. The first electrostatic filter 100a and the second electrostatic filter 100b may have the same shape and size. The first electrostatic filter 100a and the second electrostatic filter 100b may be configured to be coupled to each other between the first filter handle 200a and the second filter handle 200b.

The first side wall 104 of the electrostatic filter 100 may have the same structure as one side wall of the second filter handle 200b. The second side wall 106 of the electrostatic filter 100 may have the same structure as one side wall of the first filter handle 200a.

<Electrostatic Filter>

Figure 9:
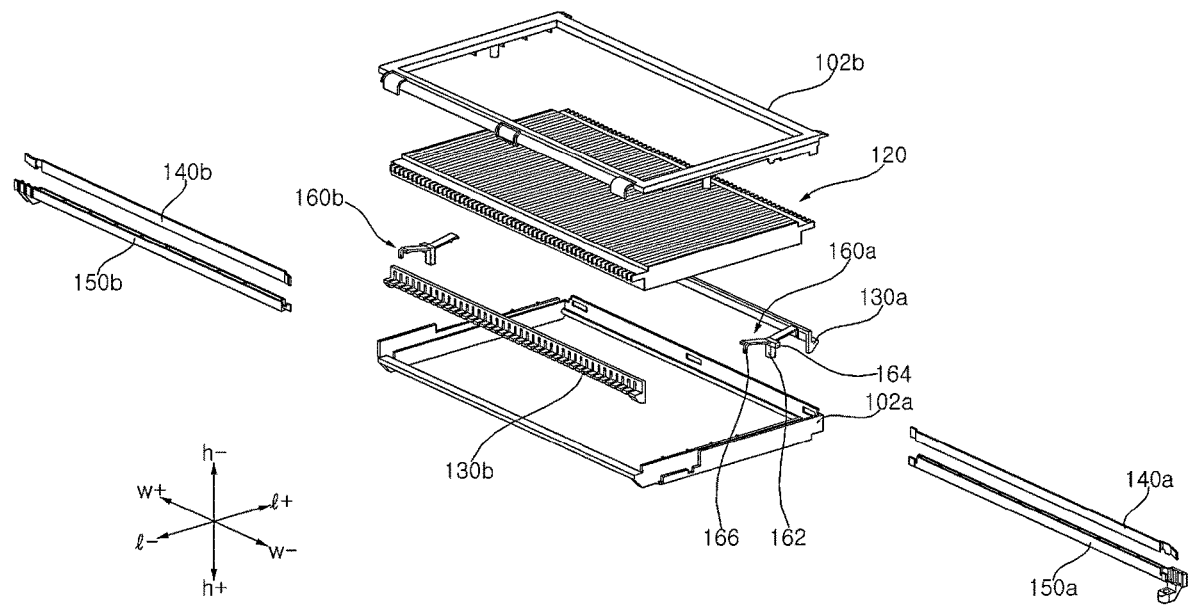
FIG. 9 is an exploded perspective view illustrating an example of an electrostatic dust collector.

Referring to FIG. 9, the electrostatic filter 100 includes a case 102 that defines an outer appearance (or exterior) of the electrostatic filter 100 and is open to allow air to flow in the height direction of the electrostatic filter 100, a plurality of electrostatic films 120 that are spaced apart from each other in the case 102 and collect dust particles from air, and a film holder 130a, 130b that is disposed in the case 102 and by which the plurality of electrostatic films 120 are spaced apart from one another.

Referring to FIG. 9, the electrostatic filter 100 further includes the button 160a, 160b to maintain or release a coupled state of the electrostatic filter 100 with an adjacent electrostatic filter 100, the first filter handle 200a, or the second filter handle 200b. Referring to FIG. 9, the button 160a, 160b protrudes upward from the case 102. Referring to FIG. 9, the electrostatic filter 100 includes a first button 160a disposed on one side of the case 102 and a second button 160b disposed on another side of the case 102.

Each of the first button 160a and the second button 160b includes a first button protrusion 162 protruding toward an upper wall of the case 102, a restoring plate 166 to restore the position of the first button protrusion 162, and a second button protrusion 164 configured to move together with the first button protrusion 162. The position of the second button protrusion 164 also changes when the first button protrusion 162 is moved in an up-and-down direction. The restoring plate 166 may be disposed inside the case 102 to restore the position of the first button protrusion 162. Therefore, when no external force is applied, the position of the first button protrusion 162 may remain unchanged. When no external force is applied to the first button protrusion 162, the first button protrusion 162 may be disposed to protrude upward from an upper surface of the case 102. The second button protrusion 164 is disposed on the coupling protrusion 104a, 106a of the case 102 to be described hereinafter. When the coupling protrusion 104a, 106a is inserted into the coupling recess 104b, 106b, the second button protrusion 164 may be inserted into a fixing recess 104c, 106c formed on the coupling recess 104b, 106b. That is, the second button protrusion 164 may allow a coupled state between the electrostatic filter 100 and another electrostatic filter 100 to be maintained. In addition, the second button protrusion 164 may allow a coupled state between the electrostatic filter 100 and the first filter handle 200a or the second filter handle 200b to be maintained.

Referring to FIG. 9, the electrostatic filter 100 may include a contact bracket 140 that connects a plurality of electrodes spaced apart from one another and a bracket holder 150 that supports the contact bracket 140. The case 102 has a flow hole through which air flows. The case 102 defines therein a space in which the plurality of electrostatic films 120 are disposed. The film holder 130a, 130b may allow the plurality of electrostatic films 120 to be spaced apart from each other at regular intervals in the case 102.

Figure 10:
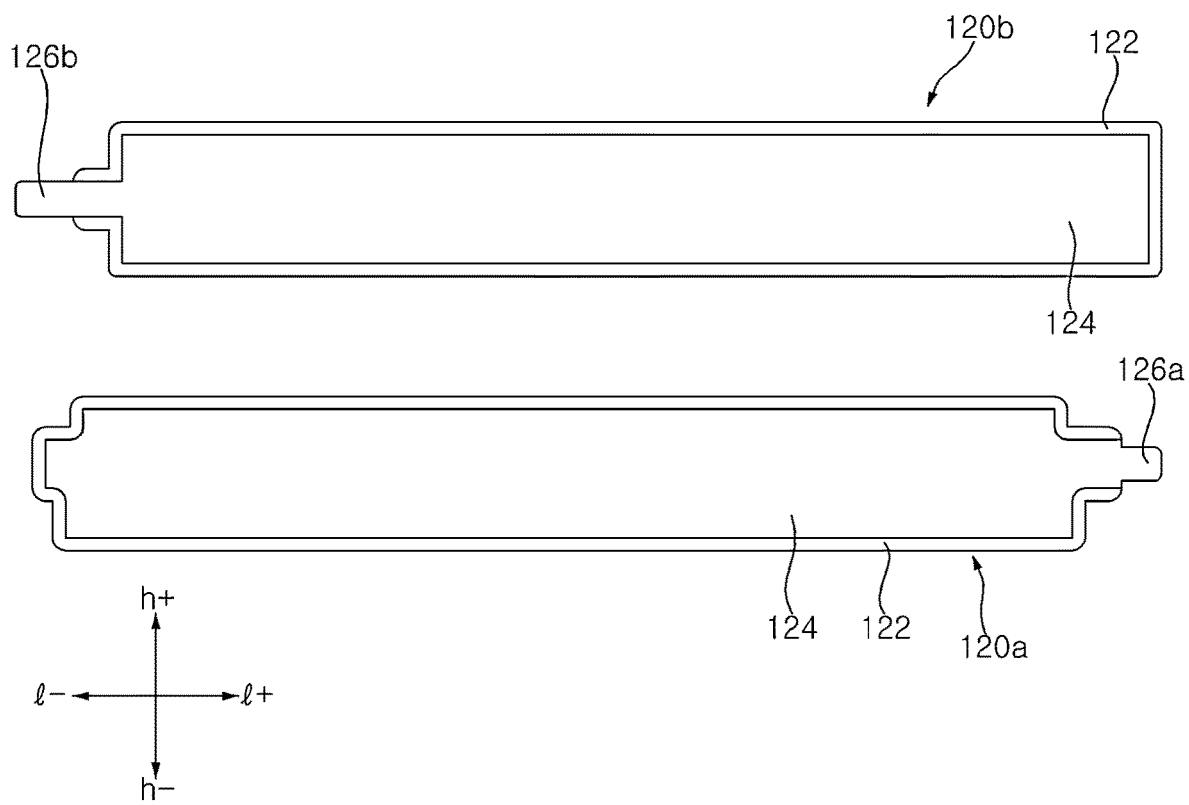
FIG. 10 is a front view illustrating an example of an electrostatic film.

A length of a first exposed end portion 126a or a second exposed end portion 126b protruding from the film holder 130a, 130b is greater than a distance between the film holder 130a, 130b and the contact bracket 140a, 140b. Referring to FIG. 10, when the case 102 is seen from the side, the case 102 may have a trapezoidal shape in which a length in the front-and-rear direction becomes narrower toward the top.

Figure 7:
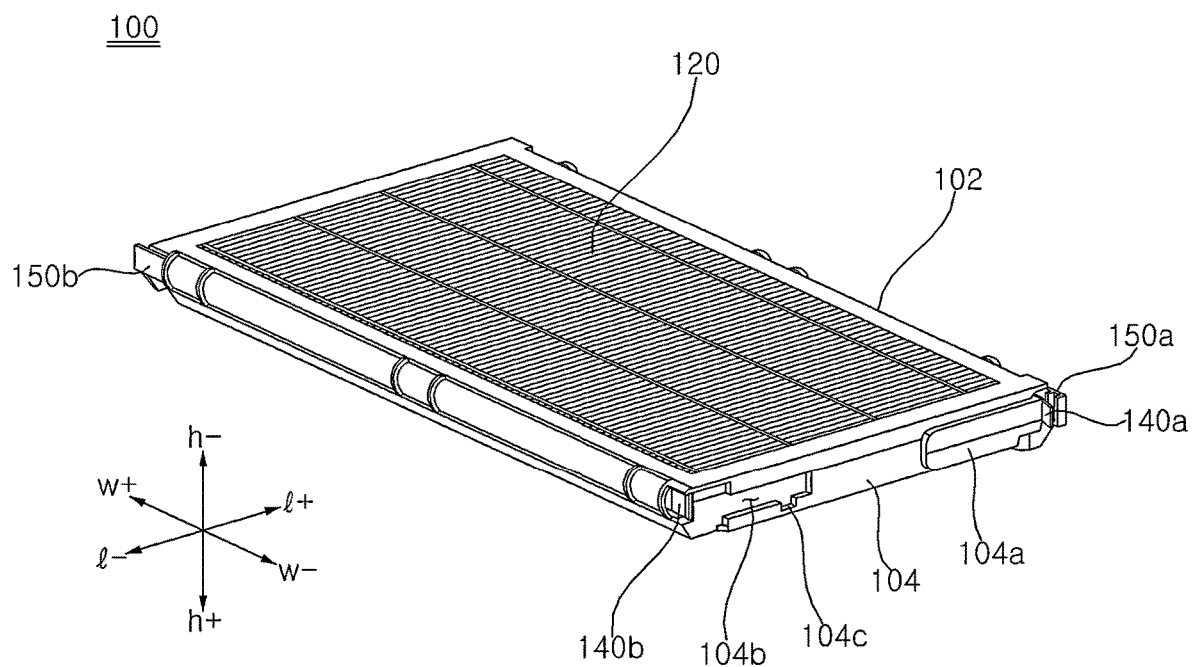
FIG. 7 is a perspective view illustrating an example of an electrostatic filter seen from one side.
Figure 8:
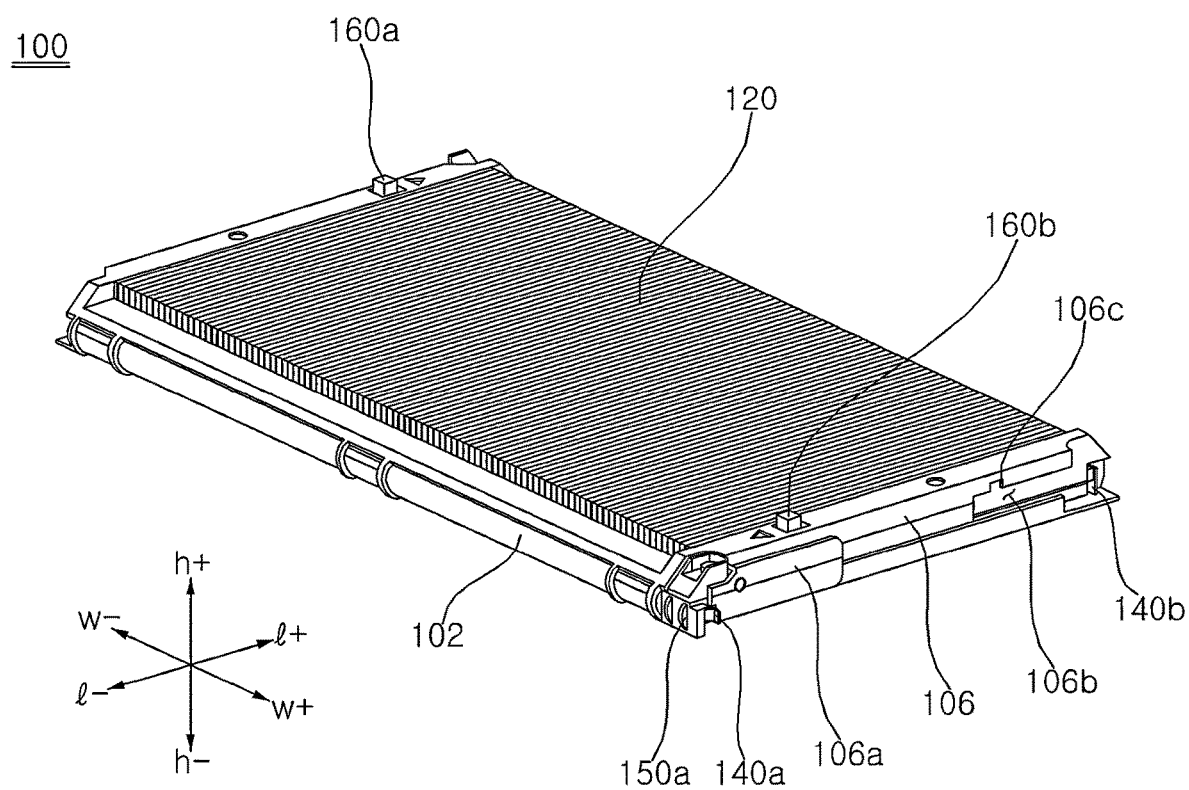
FIG. 8 is a perspective view illustrating an example of an electrostatic filter seen from another side.

Referring to FIGS. 7 and 8, the case 102 includes the first side wall 104 to which the first filter handle 200a is mounted, and the second side wall 106 to which the second filter handle 200b is mounted. Another electrostatic filter 100 may be mounted to the first side wall 104 or the second side wall 106 of the case 102.

Referring to FIGS. 7 and 8, the first side wall 104 is disposed on the left of the case 102, and the second side wall 106 is disposed on the right of the case 102. The first side wall 104 and the second side wall 106 are disposed in opposite directions to each other.

The first side wall 104 is provided with the first coupling protrusion 104a protruding outward and the first coupling recess 104b recessed inward. The second side wall 106 is provided with the second coupling recess 106b recessed inward and the second coupling protrusion 106a protruding outward.

The first coupling protrusion 104a is disposed at the rear of the first side wall 104, and the first coupling recess 104b is disposed at the front of the first side wall 104. The second coupling recess 106b is disposed at the rear of the second side wall 106, and the second coupling protrusion 106a is disposed at the front of the second side wall 106.

The first filter handle 200a or a second side wall 106 of another electrostatic filter 100 may be connected to the first side wall 104. The second filter handle 200b or a first side wall 104 of another electrostatic filter 100b may be connected to the second side wall 106. Here, the term "being connected" may include an electrical connection between the plurality of electrostatic filters 100 in addition to a structural connection between the plurality of electrostatic filters 100.

The electrostatic filter 100 and the first filter handle 200a or the second filter handle 200b may move in the front-and-rear direction, and may be coupled or released in a sliding manner. The electrostatic filter 100 and another electrostatic filter 100 may move in the front-and-rear direction, and may be coupled or released in a sliding manner.

Unlike shown in the drawings, the electrostatic filter 100 and the first filter handle 200a or the second filter handle 200b may be coupled to or released (separated) from each other by using a method other than the sliding manner. That is, the electrostatic filter 100 and the first filter handle 200a or the second filter handle 200b may be fitted to each other in the up-and-down direction or the left-and-right direction.

Similarly, the electrostatic filter 100 and another electrostatic filter 100 may be coupled to or released (separated) from each other by using a method other than the sliding manner. The first coupling protrusion 104a has a shape corresponding to the second coupling recess 106b. The second coupling protrusion 106a has a shape corresponding to the first coupling recess 104b. Accordingly, the plurality of electrostatic filters 100 coupled to each other may be disposed in the left-and-right direction.

The first coupling protrusion 104a protrudes from the first side wall 104 in a 'T' shape. The second coupling recess 106b is recessed into the second side wall 106 in a 'T' shape. The second coupling protrusion 106a protrudes from the second side wall 106 in a 'T' shape. The first coupling recess 104b is recessed into the first side wall 104 in a 'T' shape.

Referring to FIGS. 7 and 8, the first coupling protrusion 104a and the second coupling protrusion 106a extend in the front-and-rear direction. The first coupling recess 104b and the second coupling recess 106b extend in the front-and-rear direction. Accordingly, the electrostatic filter 100 may be slidingly coupled to another electrostatic filter 100. The electrostatic filter 100 may be slidingly coupled to the first filter handle 200a or the second filter handle 200b.

A first fixing recess 104c may be formed on one side of the first coupling recess 104b in the up-and-down direction. A second fixing recess 106c may be formed on one side of the second coupling recess 106b in the up-and-down direction.

Part of a second button 160b disposed at a second coupling protrusion 106a of another electrostatic filter 100 may be inserted into the first coupling recess 104b. When a user presses the second button 160b, the part of the second button 160b is pulled out from the first coupling recess 104b, allowing the electrostatic filter 100 to slidingly move in the front-and-rear direction.

Part of a first button 160a disposed at a first coupling protrusion 104a of another electrostatic filter 100 may be inserted into the second coupling recess 106b. When the user presses the first button 160a, the part of the first button 160a is pulled out from the second coupling recess 106b, allowing the electrostatic filter 100 to slidingly move in the front-and-rear direction.

The case 102 is provided with an inlet hole 108a, 110a into which the contact bracket 140 and the bracket holder 150 are inserted. The contact bracket 140 and the bracket holder 150 may be inserted through the inlet hole 108a, 110a.

A first inlet hole 108a is formed in the first side wall 104 of the case 102. The first inlet hole 108a is disposed forward relative to the first coupling protrusion 104a. A second inlet hole 110a is formed in the second side wall 106 of the case 102. The second inlet hole 110a is disposed rearward relative to the second coupling protrusion 106a. The contact bracket 140 and the bracket holder 150 are mounted to the case 102 through the first inlet hole 108a or the second inlet hole 110a.

The second side wall 106 of the case 102 is provided with a first outlet hole 108b through which one end portion of the contact bracket 140 inserted into and mounted to the first inlet hole 108a is exposed. The first side wall 104 of the case 102 is provided with a second outlet hole 110b through which one end portion of the contact bracket 140 inserted into and mounted to the second inlet hole 110a is exposed.

Figure 17:
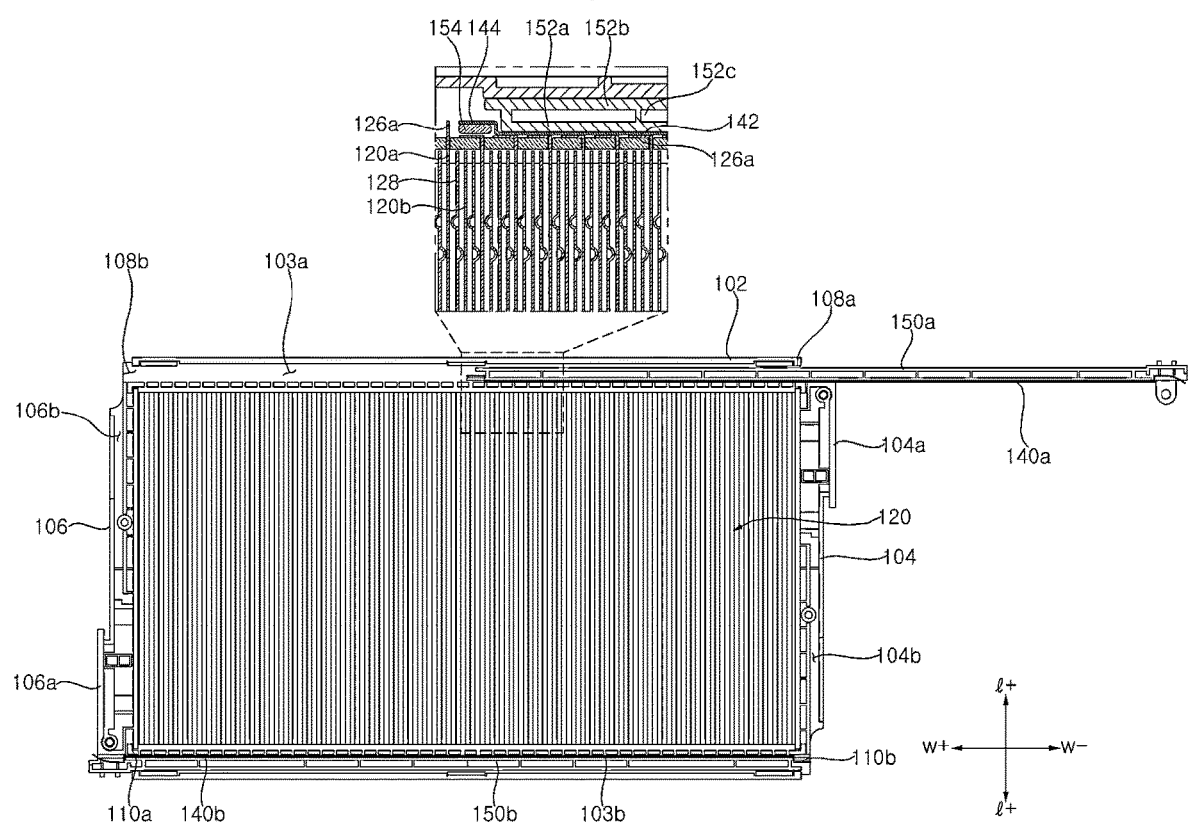
FIG. 17 illustrates an example of a contact relationship between the contact bracket and a plurality of electrostatic films of FIG. 16.

Referring to FIG. 10, the first inlet hole 108a is formed on one side of the first coupling protrusion 104a, and the first outlet hole 108b is formed on one side of the first coupling recess 104b. The case 102 has a first contact space 103a in which the contact bracket 140 inserted through the first inlet hole 108a is disposed, and a second contact space 103b in which the contact bracket 140 inserted through the second inlet hole 110a is disposed. The first contact space 103a and the second contact space 103b are disposed in different directions. Referring to FIG. 17, the first contact space 103a is disposed forward relative to the plurality of electrostatic films 120, and the second contact space 103b is disposed rearward relative to the plurality of electrostatic films 120.

A first exposed end portion 126a of each of a plurality of first electrostatic films 120a to be described later may be disposed in the first contact space 103a. A second exposed end portion 126b of each of a plurality of second electrostatic films 120b to be described later may be disposed in the second contact space 103b.

Referring to FIG. 9, the case 102 may include an upper case 102a and a lower case 102b. The upper case 102a and the lower case 102b may be coupled to each other to define a space in which the plurality of electrostatic films 120 are disposed. In a state where the upper case 102a and the lower case 102b are coupled to each other, a coupling protrusion and a coupling recess are formed on both side walls of the case 102.

The plurality of electrostatic films 120 may be disposed in the case 102. Each of the plurality of electrostatic films 120 includes an electrode 124 formed of a conductive layer through which electricity flows, and a film 122 formed of an insulating layer to fix the position of the electrode 124. The case 102 may be provided therein with a spacer 128 disposed between each of the plurality of electrostatic films 120 and by which a separation distance between each of the plurality of electrostatic films 120 is maintained.

Figure 11:
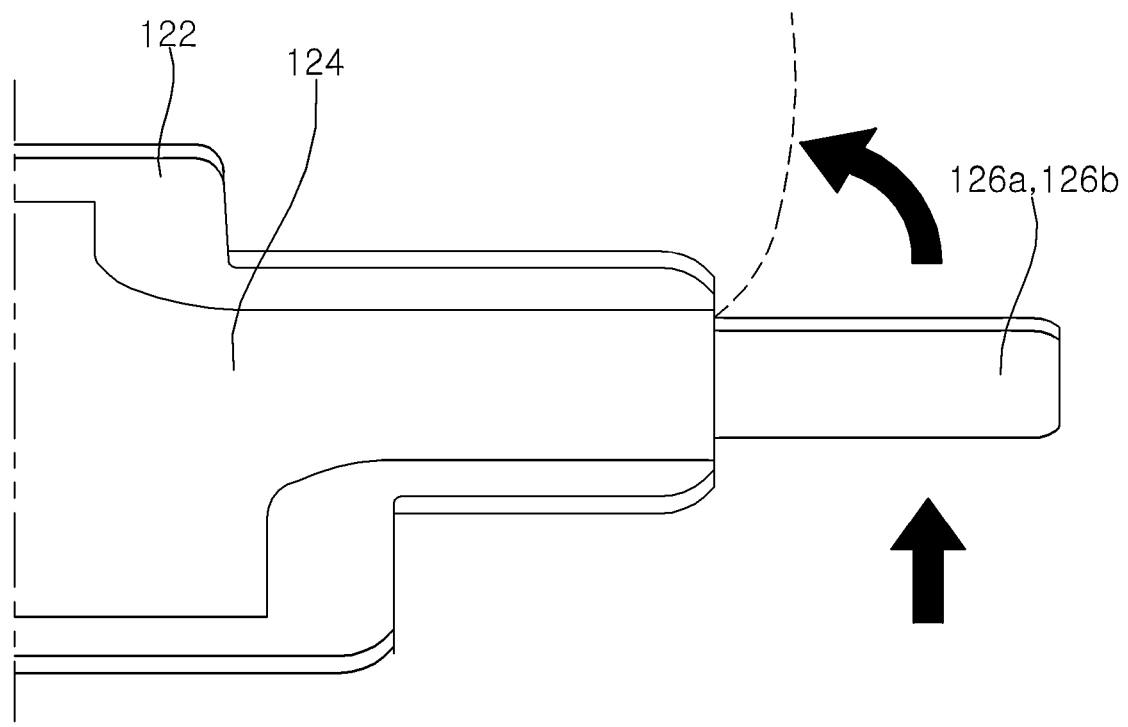
FIG. 11 is an enlarged perspective view illustrating an example of a region of an exposed end portion of an electrostatic film.
Figure 12:
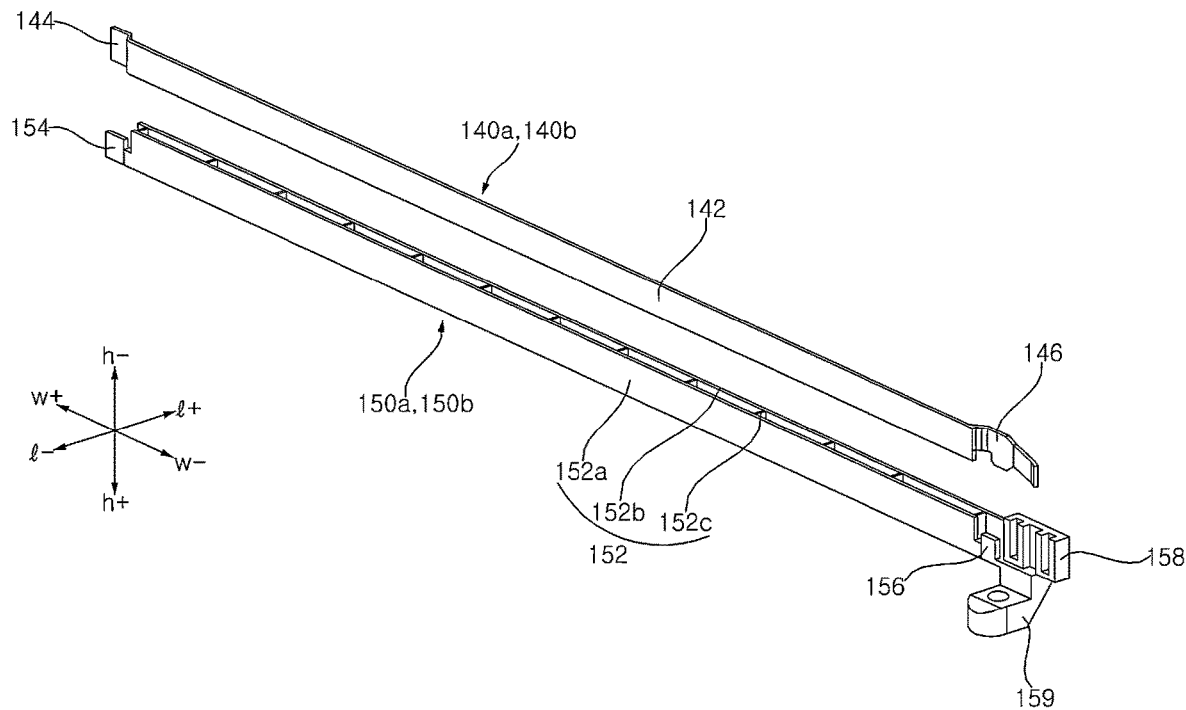
FIG. 12 is a perspective view illustrating an example of a dissembled state between a contact bracket and a bracket holder.

Referring to FIG. 11, the electrode 124 may be disposed inside the film 122. The electrode 124 may be surrounded by the film 122, so that a region in which electricity flows is not exposed to the outside. Referring to FIG. 11, the electrode 124 may include an exposed end portion 126, which is any one of the end portions in the front-and-rear direction, exposed from the film 122. The exposed end portion 126 may have an ultra-thin thickness to be deformed in the left-and-right direction. The exposed end portion 126 has a predetermined thickness or less to be deformable in a direction in which the contact bracket 140a, 140b is inserted.

The plurality of electrostatic films 120 may include a first electrostatic film 120a connected to a high voltage generating part (not shown) and a second electrostatic film 120b connected to a ground part (not shown). A plurality of first electrostatic films 120a and a plurality of second electrostatic films 120b may be alternately disposed with each other. The first electrostatic film 120a and the second electrostatic film 120b may have the same shape.

The first electrostatic film 120a and the second electrostatic film 120b are disposed such that the respective exposed end portions thereof are located in different directions. That is, referring to FIG. 17, the first exposed end portion 126a of the first electrostatic film 120a is disposed in the first contact space 103a. The second exposed end portion 126b of the second electrostatic film 120b is disposed in the second contact space 103b.

The electrostatic filter 100 includes a pair of contact brackets 140 and a pair of bracket holders 150. The electrostatic filter 100 includes a first contact bracket 140a and a first bracket holder 150a disposed in the first contact space 103a. The electrostatic filter 100 includes a second contact bracket 140b and a second bracket holder 150b disposed in the second contact space 103b.

The first contact bracket 140a and the second contact bracket 140b may have the same shape. The first bracket holder 150a and the second bracket holder 150b may have the same shape. In the following, the configuration of the contact bracket 140 and the bracket holder 150 will be described with reference to FIGS. 13 to 15. The structure of the contact bracket 140 described herein may be equally applied to the first contact bracket 140a and the second contact bracket 140b. In addition, the bracket holder 150 described herein may be equally applied to the first bracket holder 150a and the second bracket holder 150b.

The contact bracket 140 may include a contact body 142 in contact with the plurality of first electrostatic films 120 or the plurality of second electrostatic films 120, a first contact end portion 144 disposed on one side of the contact body 142 and exposed through the first outlet hole 108b or the second outlet hole 110b, and a second contact end portion 146 disposed on another (or opposite) side of the contact body 142 and exposed through the first inlet hole 108a or the second inlet hole 110a.

The contact body 142 has a structure that extends in the width direction (w+, w−) of the electrostatic filter 120 inside the case 102. The contact body 142 is disposed to intersect the plurality of electrostatic films 120 disposed in the case 102. The contact body 142 is disposed to be inclined with the plurality of electrostatic films 120. Referring to FIG. 17, the contact body 142 may be disposed perpendicular to the plurality of electrostatic films 120.

The contact body 142 is disposed on one side of a holder body 152 of the bracket holder 150 to be described hereinafter. In a state where the contact bracket 140 is mounted to the bracket holder 150, both ends of the contact bracket 140 are fixed to the bracket holder 150. The state in which the contact bracket 140 is mounted to the bracket holder 150 refers to a state in which the first contact end portion 144 is fixed to a first separation protrusion 154 of the bracket holder 150 and the second contact end portion 146 is fixed to a second separation protrusion 156 of the bracket holder 150 to allow the contact bracket 140 and the bracket holder 150 to move together. Accordingly, the contact bracket 140 and the bracket holder 150 may be inserted into the first inlet hole 108a or the second inlet hole 110a of the case 102 while the contact bracket 140 is being mounted to the bracket holder 150.

Figure 13:
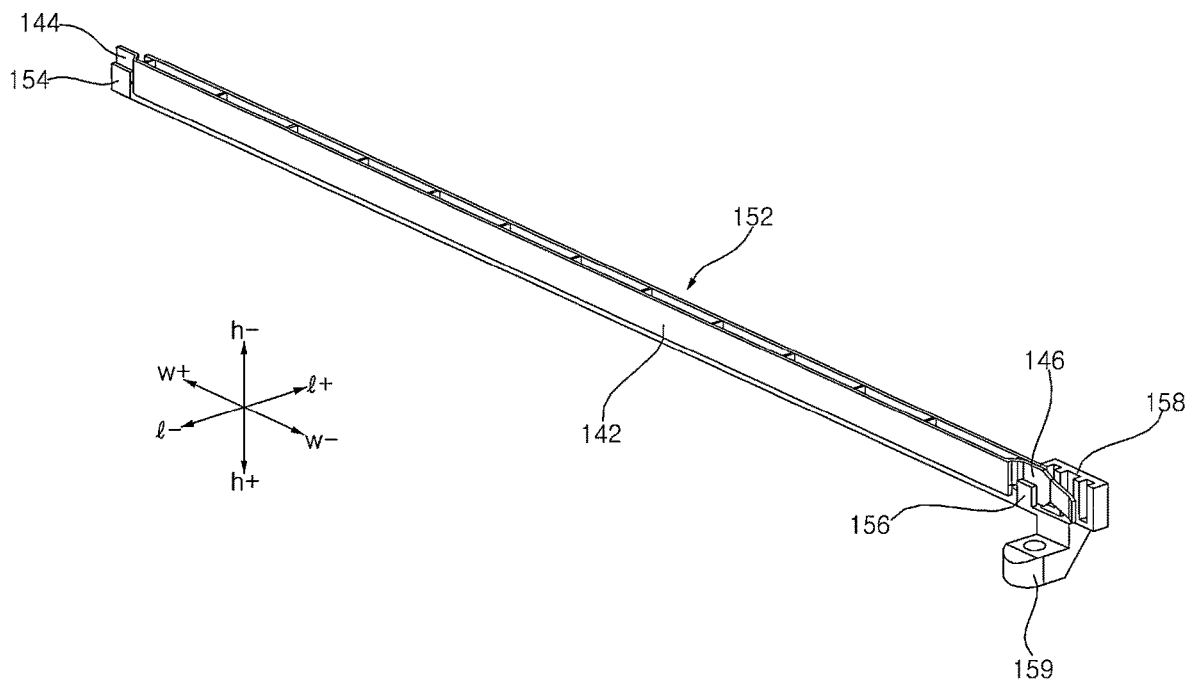
FIG. 13 is a perspective view illustrating an example of a coupled state between a contact bracket and a bracket holder.
Figure 14:
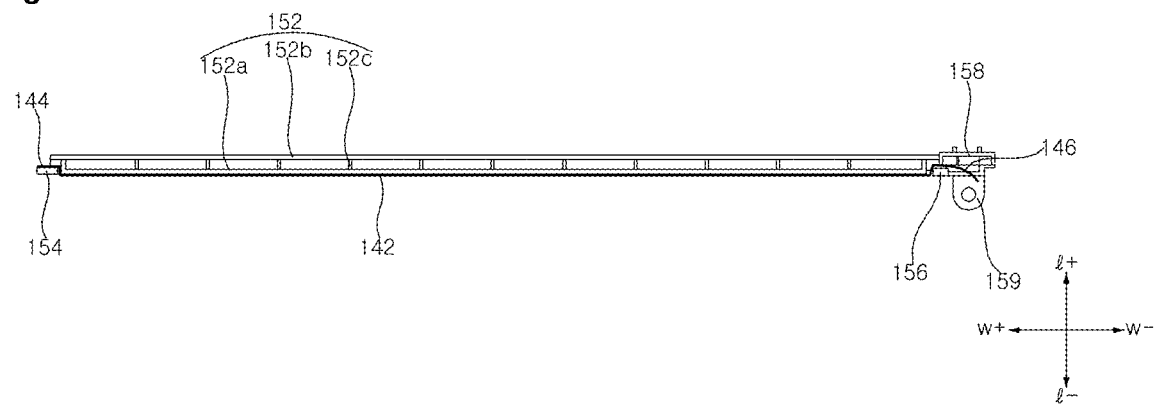
FIG. 14 is a planar view illustrating an example of a contact bracket and a bracket holder.
Figure 15:
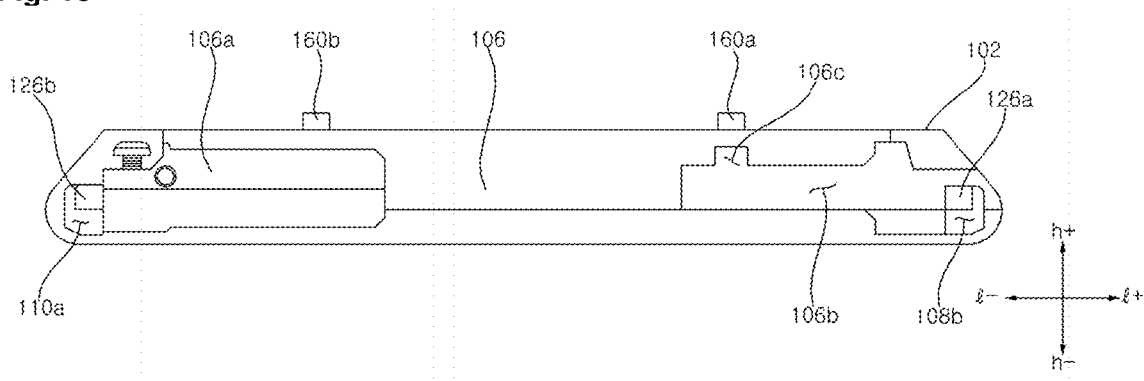
FIG. 15 is a side view illustrating an example of an electrostatic filter with a contact bracket and a bracket holder being removed.
Figure 16:
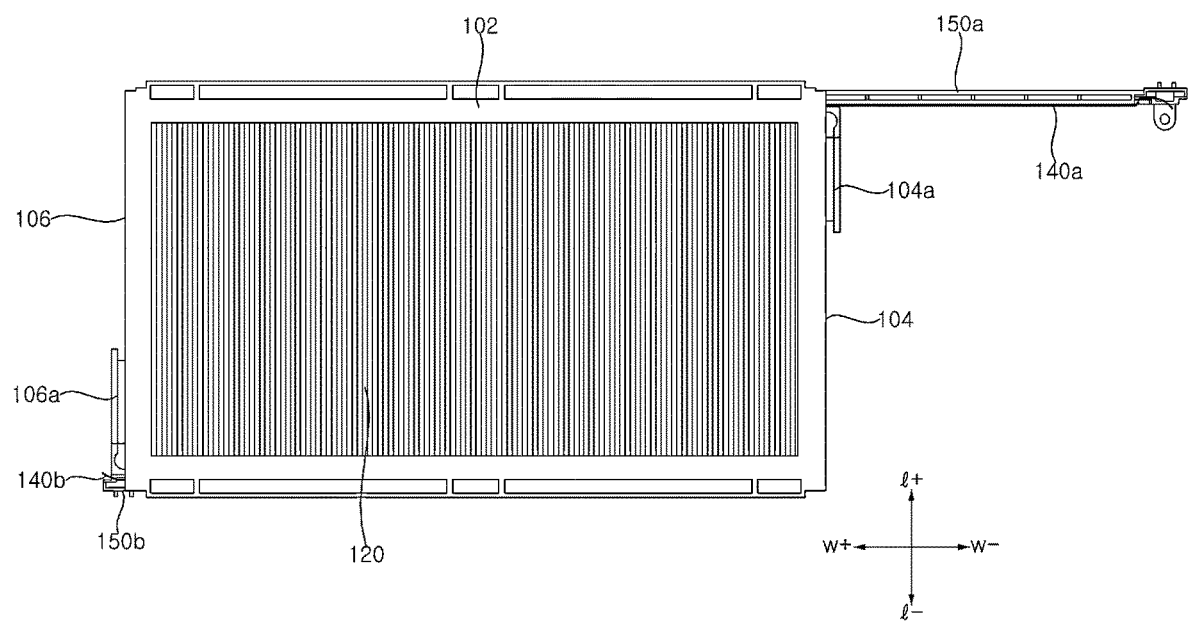
FIG. 16 illustrates an example of a state in which a contact bracket and a bracket holder are inserted into a case.

The first contact end portion 144 and the second contact end portion 146 may extend in a direction away from the contact body 142 at a position spaced a predetermined distance apart from the contact body 142 in a direction in which the bracket holder 150 is disposed. Referring to FIGS. 13 to 15, the first contact end portion 144 and the second contact end portion 146 may extend in the width direction (w+, w−) of the electrostatic filter 100 at a position spaced apart from the contact body 142 in an outward direction. Here, a direction in which the contact body 142 is disposed may be referred to as the inward direction, and a direction in which the holder body 152 of the bracket holder 150 is disposed may be referred to as the outward direction.

The first contact end portion 144 and the second contact end portion 146 extend in different directions with respect to the contact body 142. The first contact end portion 144 is bent from the contact body 142 in the outward direction and extends in an opposite direction to the contact body 142. The first contact end portion 144 extends in the opposite direction to the contact body 142 at a position spaced apart from the contact body 142 in the outward direction.

Referring to FIG. 14, the first separation protrusion 154 is disposed on one side of the contact body 142 in a direction in which the contact body 142 extends. Accordingly, the first contact end portion 144 connected to the contact body 142 may be bent along a perimeter of the first separation protrusion 154 to extend in the width direction (w+, w−) of the electrostatic filter 100. Due to the first separation protrusion 154 and the first contact end portion 144, movement of the contact bracket 140 in the width direction (w+, w−) of the electrostatic filter 100 or movement in the length direction (l+, l−) of the electrostatic dust collector 50 may be restricted.

The second contact end portion 146 is disposed on one side of the second separation protrusion 156. The second contact end portion 146 is bent from the contact body 142 in the outward direction and extends in an opposite direction to the contact body 142. The second contact end portion 146 extends in the opposite direction to the contact body 142 at a position spaced a predetermined distance apart from the contact body 142 in the outward direction. Referring to FIG. 14, the second separation protrusion 156 is disposed on another (or opposite) side of the contact body 142 in a direction in which the contact body 142 extends. Accordingly, the second contact end portion 146 connected to the another side of the contact body 142 may be bent along a perimeter of the second separation protrusion 156 to extend in the width direction (w+, w−) of the electrostatic filter 100. Due to the second separation protrusion 156 and the second contact end portion 146, movement of the contact bracket 140 in the width direction (w+, w−) of the electrostatic filter 100 or movement in the length direction (l+, l−) of the electrostatic dust collector 50 may be restricted.

A length of the second contact end portion 146 may be greater than a length of the first contact end portion 144. The first contact end portion 144 extends up to a portion where the first separation protrusion 154 of the bracket holder 150 to be described later is formed. The second contact end portion 146 extends longer than a portion where the second separation protrusion 156 is formed. The second contact end portion 146 may be bent in the inward direction at a region passing through the second separation protrusion 156.

In a state where the contact bracket 140 is mounted to the case 102, the contact body 142 is disposed to be in contact with the plurality of electrostatic films 120. Here, a state in which the contact bracket 140 is mounted to the case 102 refers to a state in which the first contact end portion 144 of the contact bracket 140 is disposed through the first outlet hole 108b or the second outlet hole 110b, and the contact bracket 140 is fixed to the case 102.

Figure 18:
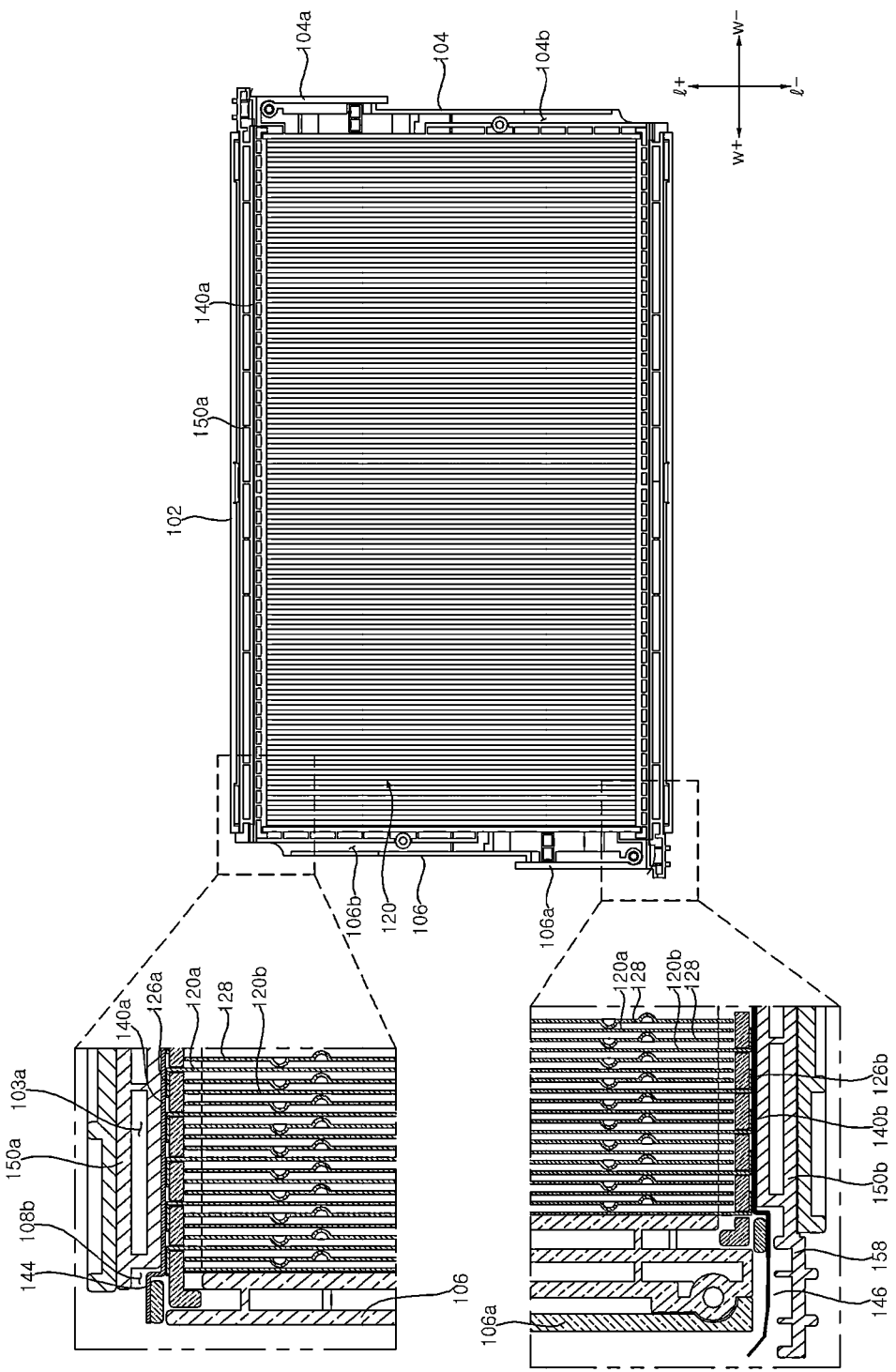
FIG. 18 is a cross-sectional view illustrating an example of an electrostatic film with a contact bracket being mounted to a case.

Referring to FIG. 18, in a state where the contact bracket 140 is mounted to the case 102, the first contact end portion 144 is disposed to be exposed to an outside of the case 102 through the first outlet hole 108b or the second outlet hole 110b. In addition, the second contact end portion 146 is disposed to be exposed to the outside of the case 102 through the first inlet hole 108a or the second inlet hole 110a.

The length of the second contact end portion 146 may be greater than the length of the first contact end portion 144. The second contact end portion 146 may have a structure that extends in the width direction (w+, w−) of the electrostatic filter 100 beyond the second separation protrusion 156.

The bracket holder 150 includes the holder body 152 disposed on one side of the contact body 142 of the contact bracket 140 to support the one side of the contact body 142, the first separation protrusion 154 disposed at one end portion of the holder body 152 to fix one end portion of the bracket 140, the second separation protrusion 156 disposed on another (or opposite) end portion of the holder body 152 to fix another (or opposite) end portion of the contact bracket 140, a holder grip 158 extending from the another end portion of the holder body 152, and a fastening portion 159 for fixing the bracket holder 150 to the case 102.

The holder body 152 may be disposed on one side of the contact body 142, and may support the shape or structure of the contact body 142. The contact body 142 may have a plate-shape with a thin thickness, allowing the contact body 142 to be easily deformed in shape. The holder body 152 is disposed in an outward direction of the contact body 142 to be in contact with the contact body 142. The holder body 152 may be in contact with a plurality of films 122 to prevent deformation of the shape of the contact body 142 inserted into the case 102.

Referring to FIG. 14, the holder body 152 includes a first body 152a extending in the width direction (w+, w−) of the electrostatic filter 100, a second body 152b disposed in parallel with the first body 152 at a position spaced apart from the first body 152a, and a connecting rib 152c provided between the first body 152a and the second body 152b to connect the first body 152a and the second body 152b. As the first body 152a and the second body 152b are connected by the connecting rib 152c, the rigidity of the holder body 152 may be reinforced.

Referring to FIG. 14, the first body 152a is disposed to be in contact with the contact body 142 at one side. The second body 152b may be spaced apart from the first body 152a in the outward direction. The holder body 152 may include a plurality of connecting ribs 152c. The plurality of connecting ribs 152c are spaced apart from each other in the width direction (w+, w−) of the electrostatic filter 100.

The first separation protrusion 154 is disposed on one side of the first body 152a. The first separation protrusion 154 is spaced apart from the first body 152a. The first contact end portion 144 that extends from the contact body 142 may be disposed between the first separation protrusion 154 and the first body 152a.

The second separation protrusion 156 is disposed on another (or opposite) side of the first body 152a. The second separation protrusion 156 is disposed opposite the first separation protrusion 154 with respect to the holder body 152. The second separation protrusion 156 is spaced apart from the first body 152a. The second contact end portion 146 that extends from the contact body 142 may be disposed between the second separation protrusion 156 and the first body 152a.

The holder grip 158 extends from the second body 152b in the width direction (w+, w−) of the electrostatic filter 100. The holder grip 158 may be spaced apart from the second separation protrusion 156 in the outward direction. The second contact end portion 146 may be disposed between the holder grip 158 and the second separation protrusion 156.

The holder grip 158 may protrude further in the outward direction than the second body 152b. Accordingly, when the contact bracket 140 and the bracket holder 150 are inserted into the case 102, the holder grip 158 is brought into contact with the case 102. Movement of the bracket holder 150 in an insertion direction into the case 102 may be restricted when the holder grip 158 comes into contact with one side of the case 102.

The fastening portion 159 may extend downward from the holder grip 158 to allow the bracket holder 150 to be fixed to one side of the case 102. The fastening portion 159 may fix the bracket holder 150 to the case 102 by using a separate fastening screw (not shown). In a state where the contact bracket 140 and the bracket holder 150 are mounted to the case 102, the bracket holder 150 may be fixed to the case 102 by the fastening screw. The state in which the contact bracket 140 and the bracket holder 150 are mounted to the case 102 may refer to a state in which the contact bracket 140 and the bracket holder 150 can no longer be inserted into the case 102.

Referring to FIGS. 17 and 18, the case 102 may be provided therein with the first contact space 103a in which the first contact bracket 140a and the first bracket holder 150a are disposed, and the second contact space 103b in which the second contact bracket 140b and the second bracket holder 150b are disposed.

The first contact bracket 140a and the first bracket holder 150a may be inserted into the first inlet hole 108a formed in the case 102. The first contact bracket 140a and the first bracket holder 150a may be slidingly coupled to the case 102. When the first contact bracket 140a and the first bracket holder 150a are inserted into the case 102, the first contact bracket 140a and the first exposed end portion 126a of the first electrostatic film 120 may come into contact with each other. Referring to FIG. 11, the shape of the first exposed end portion 126a may be deformed by the first contact bracket 140a. Referring to FIG. 17, the shape of the first exposed end portion 126a may be deformed in a direction in which the first contact bracket 140a is inserted. In a state where the shape of the first exposed end portion 126a is deformed by the first contact bracket 140a, the first exposed end portion 126a is disposed to be in contact with the first contact bracket 140a. Likewise, the second contact bracket 140b and the second bracket holder 150b may come into contact with the second exposed end portion 126b of the second electrostatic film 120 disposed in the second contact space 103b.

Referring to FIG. 18, in a state where the first contact bracket 140a is mounted to the case 102, the first contact end portion 144 of the first contact bracket 140a is disposed to protrude from the first outlet hole 108b. The first contact end portion 144 of the first contact bracket 140a is disposed so as not to interfere with movement of the component inserted into the second coupling recess 106b while the first contact bracket 140a is being mounted to the case 102. Referring to FIG. 18, in a state where the first contact bracket 140a is mounted to the case 102, the first contact end portion 144 of the first contact bracket 140a is disposed so as not to protrude further than the second coupling recess 106b formed on the second side wall 106. Referring to FIG. 18, in a state where the first contact bracket 140a is mounted to the case 102, the first contact end portion 144 of the first contact bracket 140a is disposed so as not to protrude further in the width direction (w+, w−) of the electrostatic filter 100 than a wall surface defining the second coupling recess 106b.

Referring to FIG. 18, in a state where the first bracket holder 150a is mounted to the case 102, the first separation protrusion 154 of the first bracket holder 150a is disposed to protrude to an outside of the first outlet hole 108b. Referring to FIG. 18, in a state where the first bracket holder 150a is mounted to the case 102, the first separation protrusion 154 of the first bracket holder 150a is disposed so as not to protrude further in the width direction (w+, w−) of the electrostatic filter 100 than the wall surface defining the second coupling recess 106b.

Referring to FIG. 18, in a state where the first contact bracket 140a is mounted to the case 102, the second contact end portion 146 of the first contact bracket 140a is disposed to protrude to the outside of the case 102 from the first inlet hole 108a. Referring to FIG. 18, in a state where the first contact bracket 140a is mounted to the case 102, the second contact end portion 146 of the first contact bracket 140a is disposed so as not to protrude further in the width direction (w+, w−) of the electrostatic filter 100 than the first coupling protrusion 104a formed on the first side wall 104.

Referring to FIG. 18, in a state where the first bracket holder 150a is mounted to the case 102, the second separation protrusion 156 of the first bracket holder 150a is disposed to protrude to an outside of the first inlet hole 108a. Referring to FIG. 18, in a state where the first bracket holder 150a is mounted to the case 102, the second separation protrusion 156 of the first bracket holder 150a is disposed so as not to protrude further in the width direction (w+, w−) of the electrostatic filter 100 than a wall surface defining the second coupling protrusion 106a. Referring to FIG. 18, the second contact bracket 140b and the second bracket holder 150b may be disposed in the same manner as the first contact bracket 140a and the first bracket holder 150a.

<First Filter Handle and Second Filter Handle>

Referring to FIGS. 4 to 6, the electrostatic dust collector 50 includes the first filter handle 200a and the second filter handle 200*b*. The first filter handle 200*a* and the second filter handle 200*b* may be left-right symmetric. The first filter handle 200*a* and the second filter handle 200*b* may have the same configuration. Part or some of the components included in each of the first filter handle 200*a* and the second filter handle 200*b* may be differently arranged.

Hereinafter, the components of the second filter handle 200*b* will be described with reference to FIGS. 19 to 22. The second filter handle 200*b* includes an inner cover 202 that has a wall surface facing the electrostatic filter 100, an outer cover 210 that is disposed on one side of the inner cover 202 and is provided with a fixing protrusion 214 engaged with the housing 10, a handle button 240 to fix or release the second filter handle 200*b* to or from the housing 10, a first connector 220 that is disposed on one side of a corresponding protrusion 204*a* formed on one side of the inner cover 202 and is electrically connected to the electrostatic film 120, a second connector 230 that is disposed on one side of a corresponding recess 204*b* formed on another (or opposite) side of the inner cover 202, and a switch 250 that causes the first connector 220 and the second connector 230 to be short-circuited or un-short-circuited.

The inner cover 202 includes a corresponding wall 204 facing the electrostatic filter 100. The corresponding wall 204 of the inner cover 202 is provided with the corresponding protrusion 204*a* inserted into the coupling recess (104*b*, 106*b*) of the electrostatic filter 100, and the corresponding recess 204*b* into which the coupling protrusion (104*a*, 106*a*) of the electrostatic filter 100 is inserted.

The inner cover 202 is provided with a first connector recess 206*a* defining a space in which the first connector 220 is accommodated, a second connector recess 206*b* defining a space in which the second connector 230 is accommodated, and a switch recess 206*c* defining a space in which the switch 250 is accommodated.

The outer cover 210 may be disposed to surround a remaining portion of the inner cover 202 except the corresponding wall 204. The outer cover 210 and the inner cover 202 may be coupled to each other. The outer cover 210 and the inner cover 202 may be coupled to each other by a separate fastening member.

The outer cover 210 may include an outer wall 212 that faces a surface opposite to the corresponding wall 204 of the inner cover 202. The outer wall 212 may be a wall surface that faces the filter housing 20 to which the filter handle 200*a*, 200*b* is mounted. The outer wall 212 may be provided with the fixing protrusion 214 to fix the filter handle 200*a*, 200*b* to the filter housing 20. The fixing protrusion 214 may be spaced apart from the handle button 240 in the length direction (l+, l−) of the electrostatic dust collector 50.

A first connector hole 216*a* through which part of the first connector 220 to be described later is exposed, a second connector hole 216*b* through which part of the second connector 230 to be described later is exposed, and a switch hole 216*c* through which part of the switch 250 is exposed may be formed on an upper surface of the outer cover 210.

Figure 26:
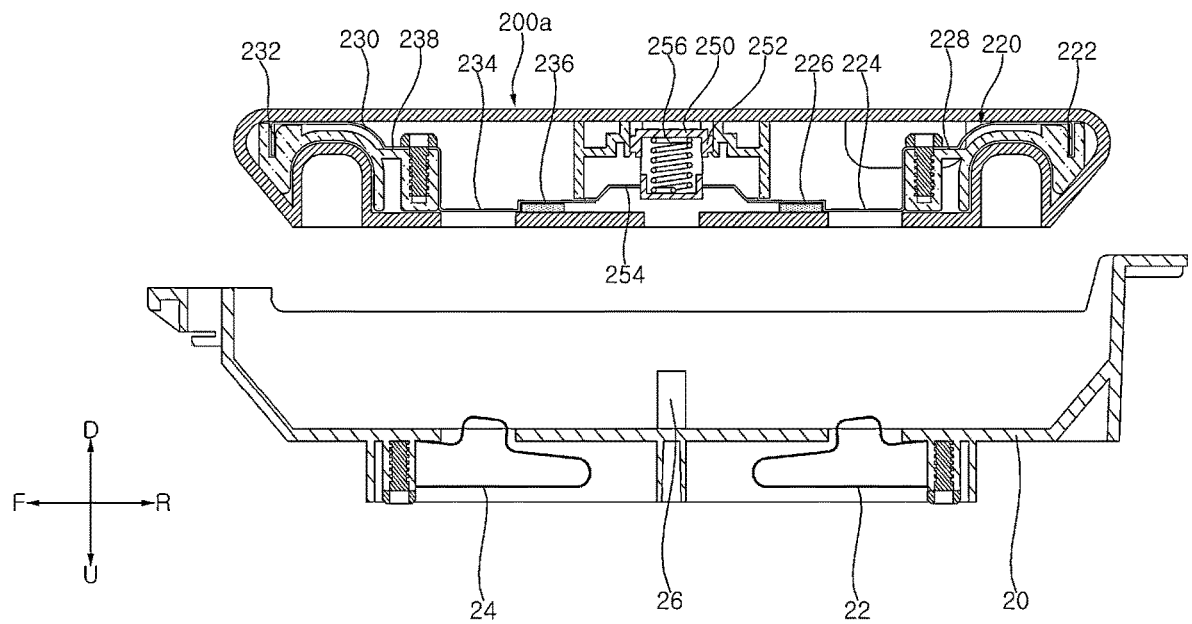
FIG. 26 is a cross-sectional view illustrating an example of a state before a filter handle and a filter housing are coupled to each other.
Figure 27:
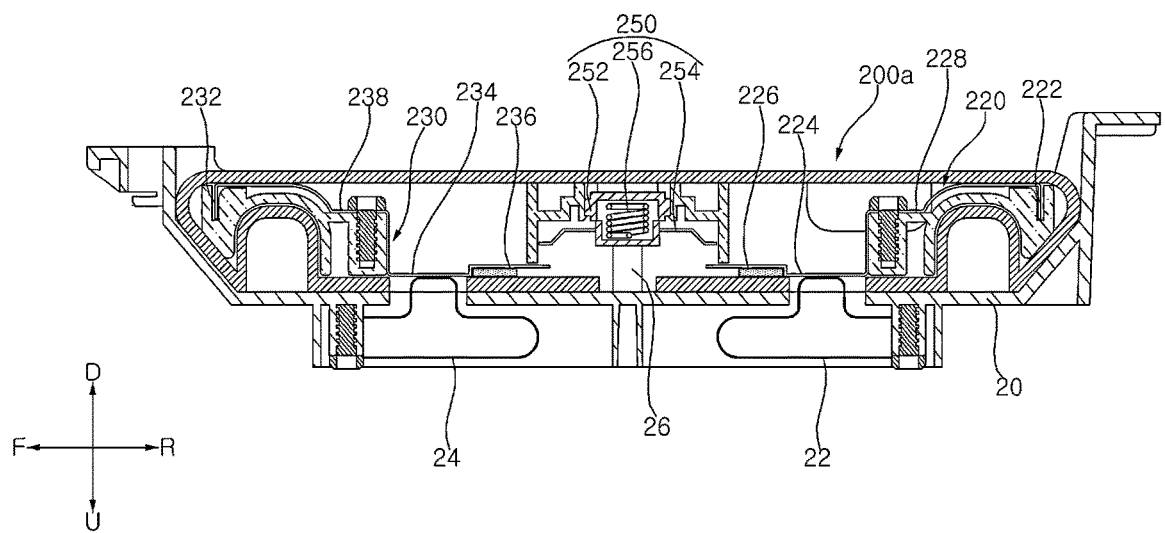
FIG. 27 is a cross-sectional view illustrating an example of a coupled state between a filter handle and a filter housing.
Figure 28:
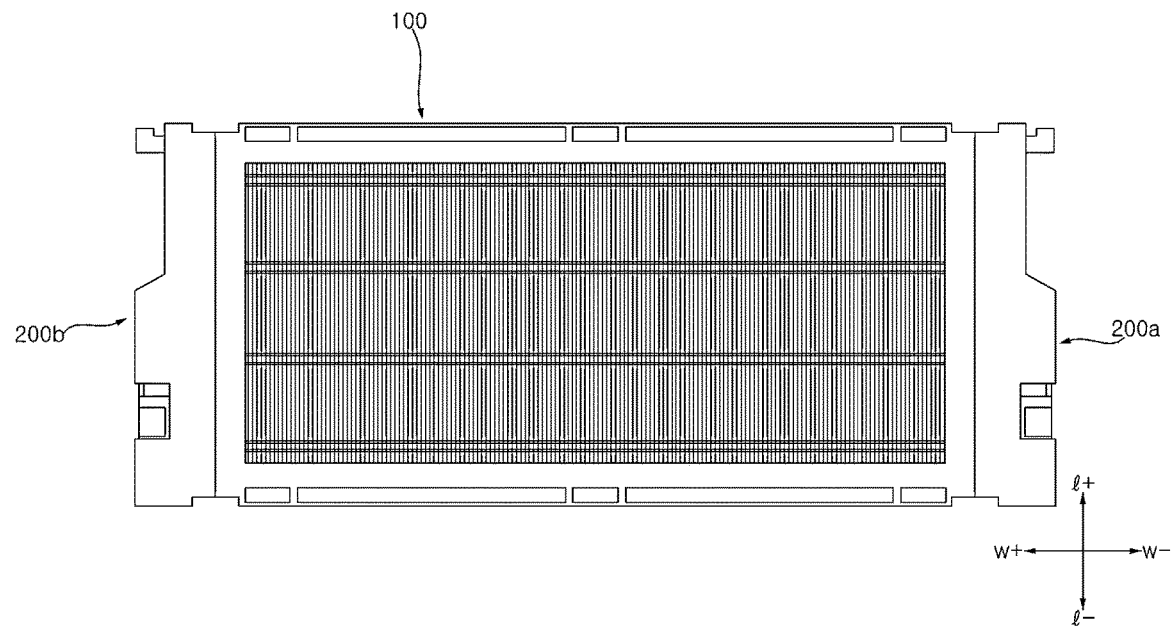
FIG. 28 illustrates an example of a coupled state between one electrostatic filter and two filter handles.
Figure 29:
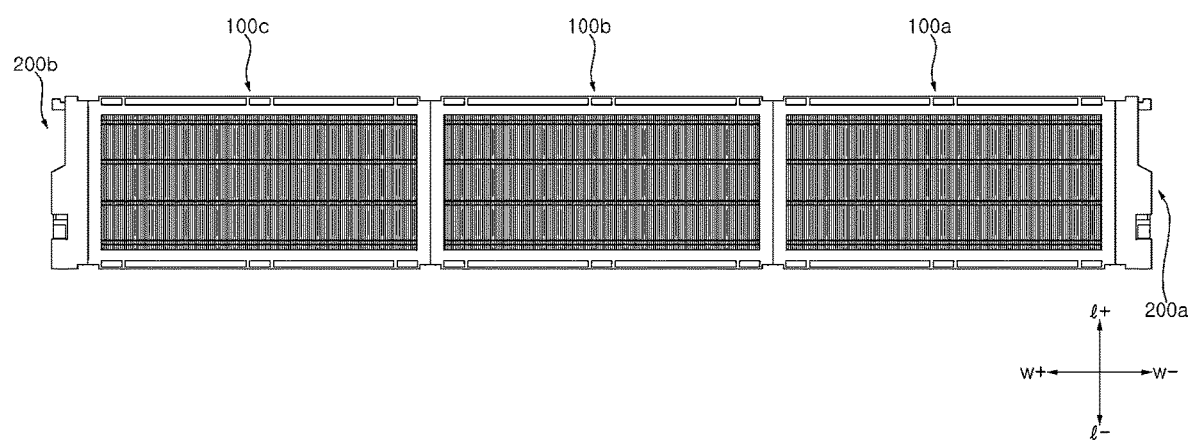
FIG. 29 illustrates an example of a coupled state between three electrostatic filters and two filter handles.

A first exposure plate 224 of the first connector 220 to be described later is disposed at the first connector hole 216*a*. A second exposure plate 234 of the second connector 230 to be described later is disposed at the second connector hole 216*b*. Referring to FIGS. 26 and 27, when the electrostatic dust collector 50 is mounted to the filter housing 20, the first connector 220 may come into contact with a first contact switch 22 provided at the filter housing 20. Referring to FIGS. 26 and 27, when the electrostatic dust collector 50 is mounted to the filter housing 20, the second connector 230 may come into contact with a second contact switch 24 provided at the filter housing 20.

Part of the switch 250 may be disposed in the switch hole 216*c*. Accordingly, when the electrostatic dust collector 50 is mounted to the filter housing 20, a shorting plate 254 of the switch 250 may be moved downward by a press protrusion 26 of the filter housing 20. As the shorting plate 254 is moved downward, contact between the shorting plate 254 and the first connector 220 and the second connector 230 may be released.

A first button hole 218*a* through which part of the handle button 240 is exposed may be formed on a lower surface of the outer cover 210, and a second button hole 218*b* through which another part of the handle button 240 is exposed may be formed on the upper surface of the outer cover 210.

A press body 244 of the handle button 240 described hereinafter may be disposed in the first button hole 218*a*. A hook 242 of the handle button 240 to be described hereinafter may be disposed in the second button hole 218*b*.

The handle button 240 includes the hook 242 to fix the filter handle 200*a*, 200*b* to one side of the filter housing 20, the press body 244 configured to be changed in position by external pressure and configured to release the engagement of the hook 242, and an elastic body 246 configured to restore the position of the press body 244 when no external force is applied.

The press body 244 and the hook 242 may be formed as one body to move together. The press body 244 and the hook 242 may be configured to move in the length direction (l+, l−) of the electrostatic dust collector 50.

When no external force acts on the press body 244, the position of the press body 244 and the hook 242 may be determined by the elastic body 246. That is, as the elastic body 246 is disposed on one side of the outer cover 210, the position of the press body 244 and the hook 242 may be kept constant. When force is applied to the press body 244 by only the elastic body 246, the hook 242 may be engaged with one side of the filter housing 20. Accordingly, the electrostatic dust collector 50 may be fixed into the filter housing 20.

However, when the user or the like presses the press body 244, the position of the hook 242 may be changed. When pressure is applied to the press body 244 in an opposite direction to an elastic force of the elastic body 246, the engagement of the hook 242 may be released. Accordingly, one side of the electrostatic dust collector 50 fixed to the filter housing 20 may be released or separated from the filter housing 20.

The first connector 220 and the second connector 230 may allow the electrostatic filter 100 and the high voltage generating part or the ground part to be electrically connected to each other. The first connector 220 and the second connector 230 may be disposed opposite each other with respect to the switch 250. An end portion of each of the first connector 220 and the second connector 230 may be in contact with the shorting plate 254 of the switch 250.

The first connector 220 includes a first connecting plate 222 electrically connected to the electrostatic film 120 of the electrostatic filter 100, the first exposure plate 224 provided at the outer cover 210, the first contact plate 226 disposed to be in contact with the switch 250, and a first fastening plate 228 to fix the first connector 220 to one side of the inner cover 202. The first fastening plate 228 may be fixed to the inner cover 202 by using a separate fastening screw 228*a*.

Figure 21:
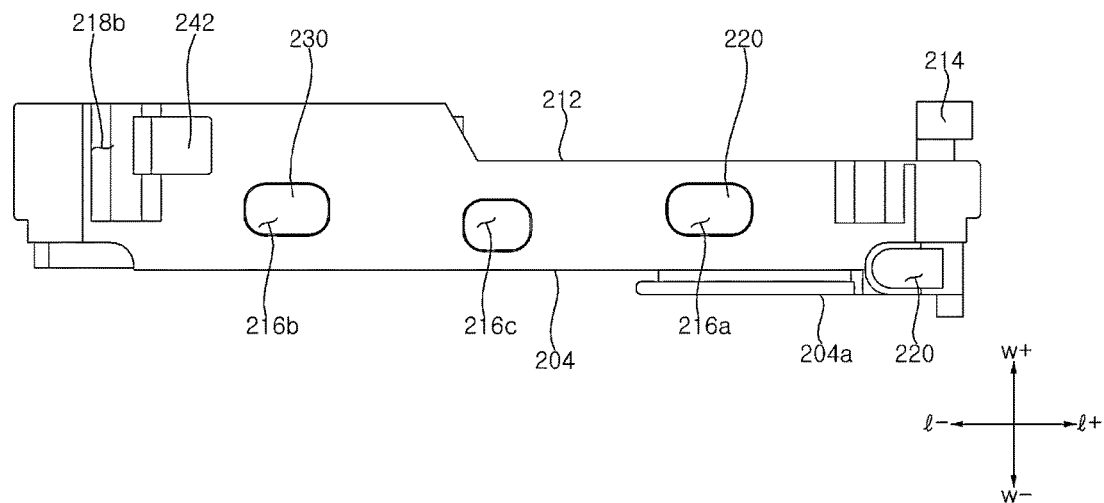
FIG. 21 is a planar view illustrating an example of a second filter handle.
Figure 22:
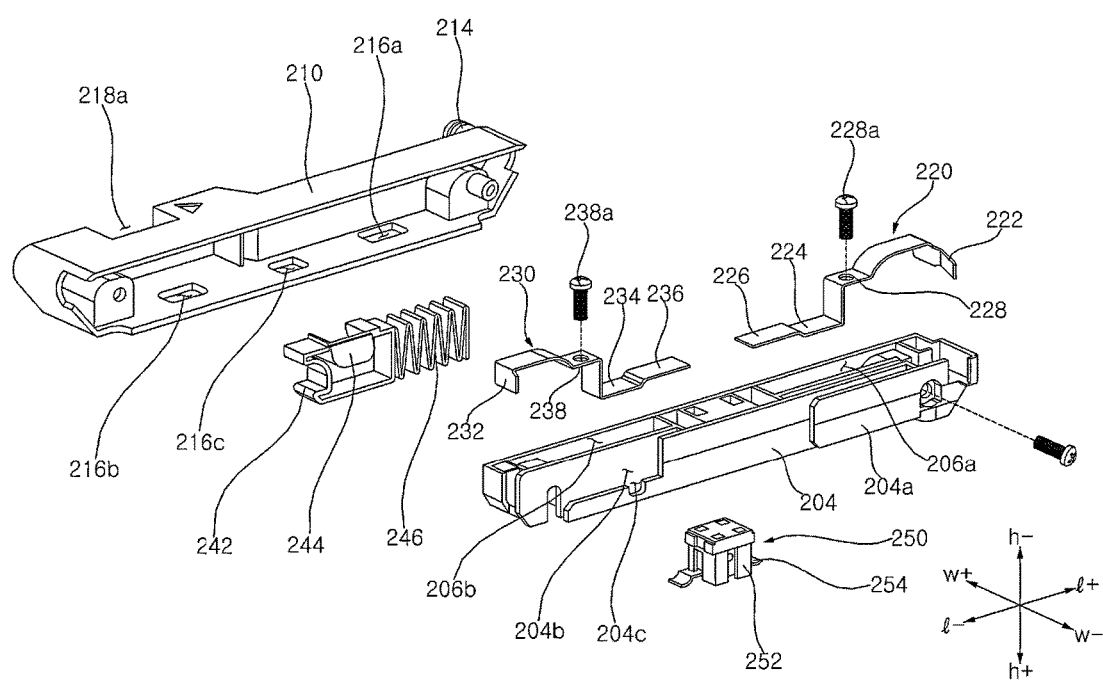
FIG. 22 is an exploded perspective view illustrating an example of a second filter handle.

The first connecting plate 222 is disposed on one side of the corresponding protrusion 204*a*. Referring to FIG. 21, the first connecting plate 222 is disposed to protrude further than a side wall defining the corresponding protrusion 204a.

The second connector 230 includes a second connecting plate 232 electrically connected to the electrostatic film 120 of the electrostatic filter 100, the second exposure plate 234 disposed at the second connector hole 216b formed on the outer cover 210, a second contact plate 236 in contact with the switch 250, and a second fastening plate 238 to fix the second connector 230 to one side of the inner cover 202.

The second connecting plate 232 is disposed on one side of the corresponding recess 204b. The second connecting plate 232 is disposed so as not to protrude further than a side wall defining the corresponding recess 204b. The second fastening plate 238 may be fixed to the inner cover 202 by using a separate fastening screw 238a.

The switch 250 includes a switch body 252, the shorting plate 254 that connects the first connector 220 and the second connector 230, and an elastic body 256 disposed inside the switch body 252 and configured to the position of the shorting plate 254.

The shorting plate 254 is configured to move in the height direction (h+, h−) of the electrostatic dust collector 50. The elastic body 256 applies a downward pressure to the shorting plate 254. Therefore, when no external force acts on the shorting plate 254, only an elastic force of the elastic body 256 acts to thereby fix the shorting plate 254 to a downward position.

When the shorting plate 254 is fixed to the downward position by the elastic body 256, the shorting plate 254 may come into contact with the first connector 220 and the second connector 230. When the position of the shorting plate 254 is moved upward by an external force, contact of the shorting plate 254 with the first connector 220 and the second connector 230 may be released.

The first filter handle 200a may include the same configuration as the second filter handle 200b. However, there may be some differences in the arrangement of the components of the first filter handle 200a and the components of the second filter handle 200b.

Figure 19:
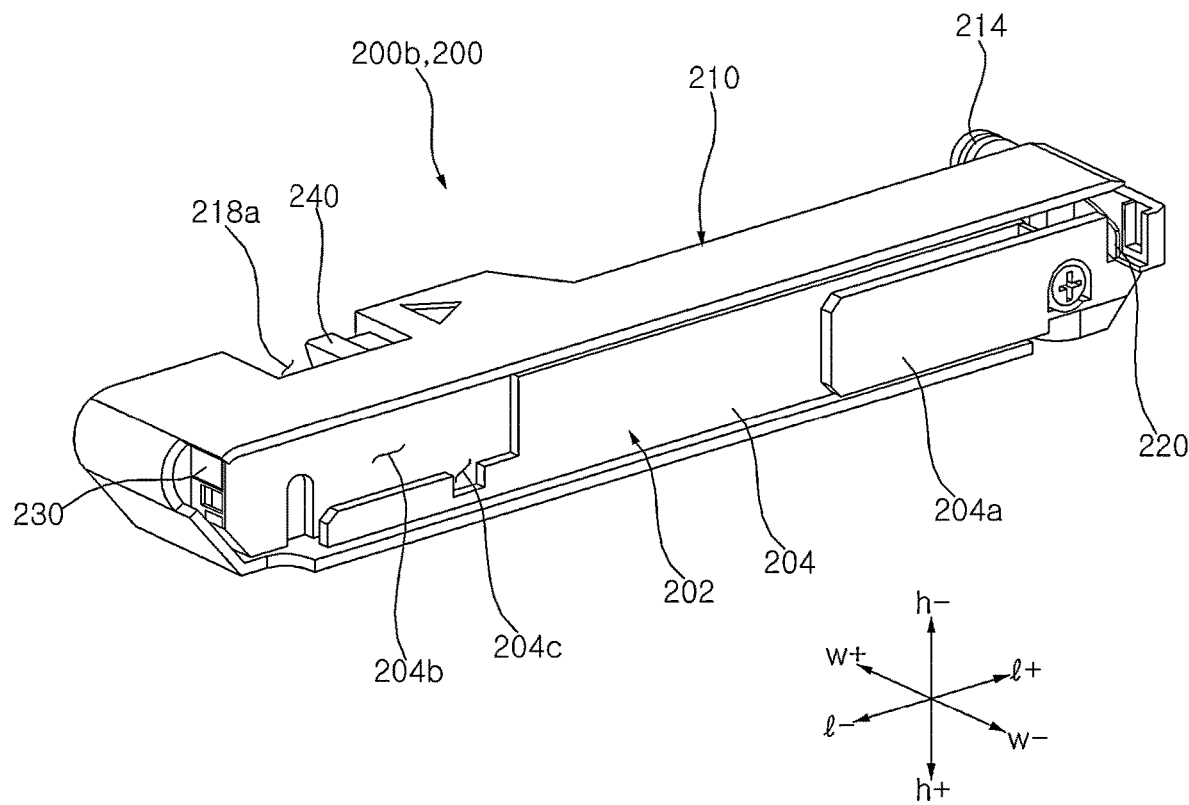
FIG. 19 is a perspective view illustrating an example of a second filter handle.
Figure 20:
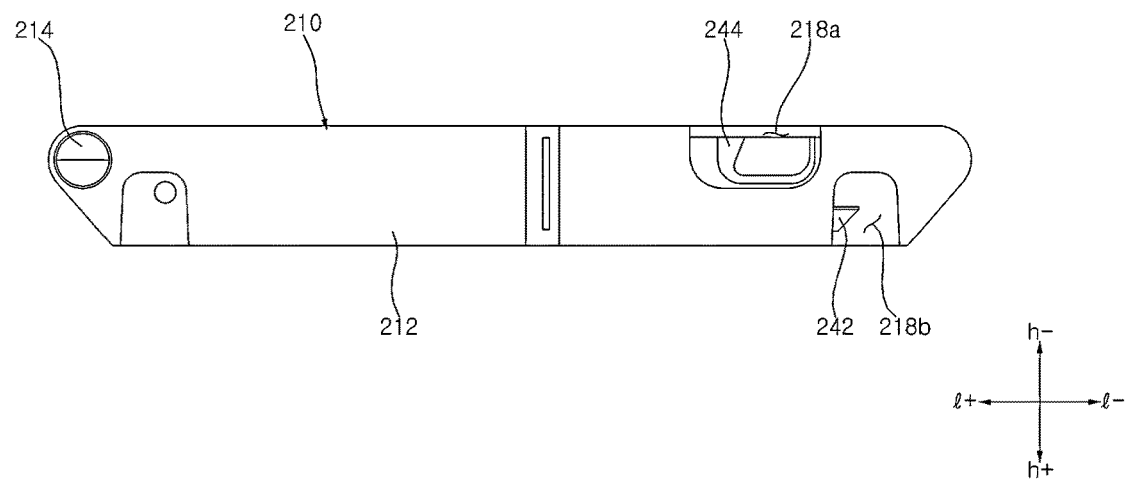
FIG. 20 is a side view illustrating an example of a second filter handle.

Referring to FIG. 19, the second filter handle 200b is configured such that the corresponding protrusion 204a is disposed at the front thereof and the corresponding recess 204b is disposed behind the corresponding protrusion 204a. In addition, the corresponding wall 204 facing the electrostatic filter 100 is disposed on a right side or surface of the second filter handle 200b. The second filter handle 200b is configured such that the first connector 220 provided on one side of the corresponding protrusion 204a is disposed at the front thereof, and the second connector 230 provided on one side of the corresponding recess 204b is disposed at the rear relative to the first connector 220.

The first filter handle 200a is configured such that the corresponding recess 204b is disposed at the front thereof, and the corresponding protrusion 204a is disposed behind the corresponding recess 204b. In addition, the corresponding wall 204 facing the electrostatic filter 100 is disposed on a left side or surface of the first filter handle 200a. The first filter handle 200a is configured such that the second connector 230 provided on one side of the corresponding recess 204b is disposed at the front thereof, and the first connector 220 provided on one side of the corresponding protrusion 204a is disposed at the rear relative to the second connector 230.

<Coupling Relationship>

Figure 23:
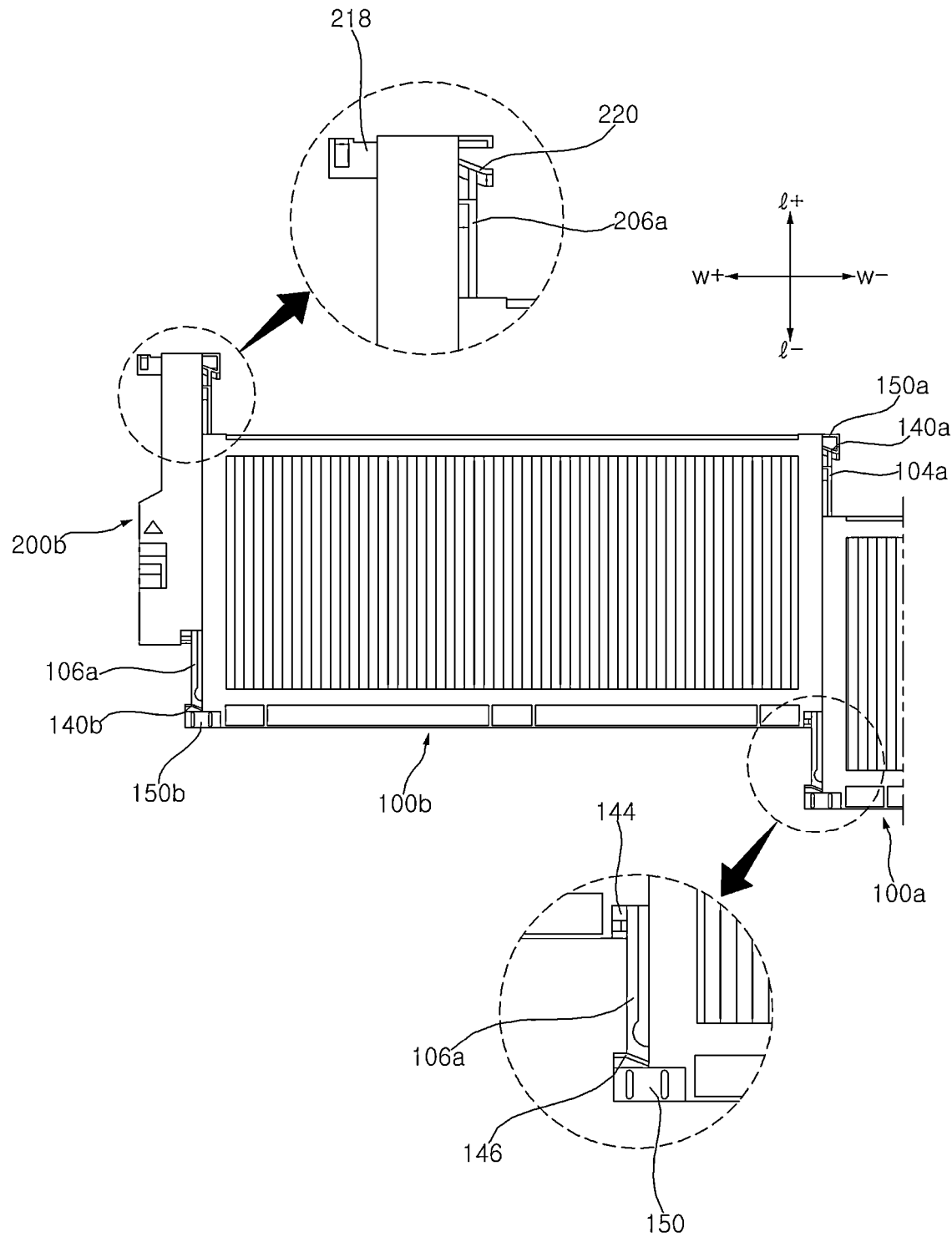
FIG. 23 illustrates an example of a coupling relationship between an electrostatic filter and a filter handle.

The electrostatic filter 100 may be connected to another electrostatic filter 100 or the filter handle 200a, 200b. The electrostatic filter 100 may be coupled to another electrostatic filter 100 or the filter handle 200a, 200b while moving forward and rearward. Referring to FIGS. 6 and 23, the electrostatic dust collector 50 according to an embodiment of the present disclosure may include the first electrostatic filter 100a and the second electrostatic filter 100b.

A first coupling protrusion 104a and a first coupling recess 104b provided on a first side wall 104 of the second electrostatic filter 100b may be connected to a second coupling recess 106b and a second coupling protrusion 106a provided on a second side wall 106 of the first electrostatic filter 100a disposed adjacent to the second electrostatic filter 100b.

In addition, a first side wall 104 of the first electrostatic filter 100a may be connected to the first filter handle 200a disposed on one side of the first electrostatic filter 100a. Referring to FIG. 23, a second coupling protrusion 106a and a second coupling recess 106b disposed on a second side wall 106 of the second electrostatic filter 100b may be connected to the corresponding protrusion 204a and the corresponding recess 204b provided on the corresponding wall 204 of the second filter handle 200b.

The second coupling protrusion 106a and the second coupling recess 106b provided on the second side wall 106 of the first electrostatic filter 100a are respectively connected to the first coupling recess 104b and the first coupling protrusion 104a provided on the first side wall 104 of the second electrostatic filter 100b disposed adjacent to the first electrostatic filter 100a.

In addition, the second side wall 106 of the second electrostatic filter 100b may be connected to the second filter handle 200b disposed on one side of the second electrostatic filter 100b. The second coupling protrusion 106a and the second coupling recess 106b provided on the second side wall 106 of the second electrostatic filter 100b may be connected to the corresponding protrusion 204a and the corresponding recess 204b of the second filter handle 200b.

Figure 24:
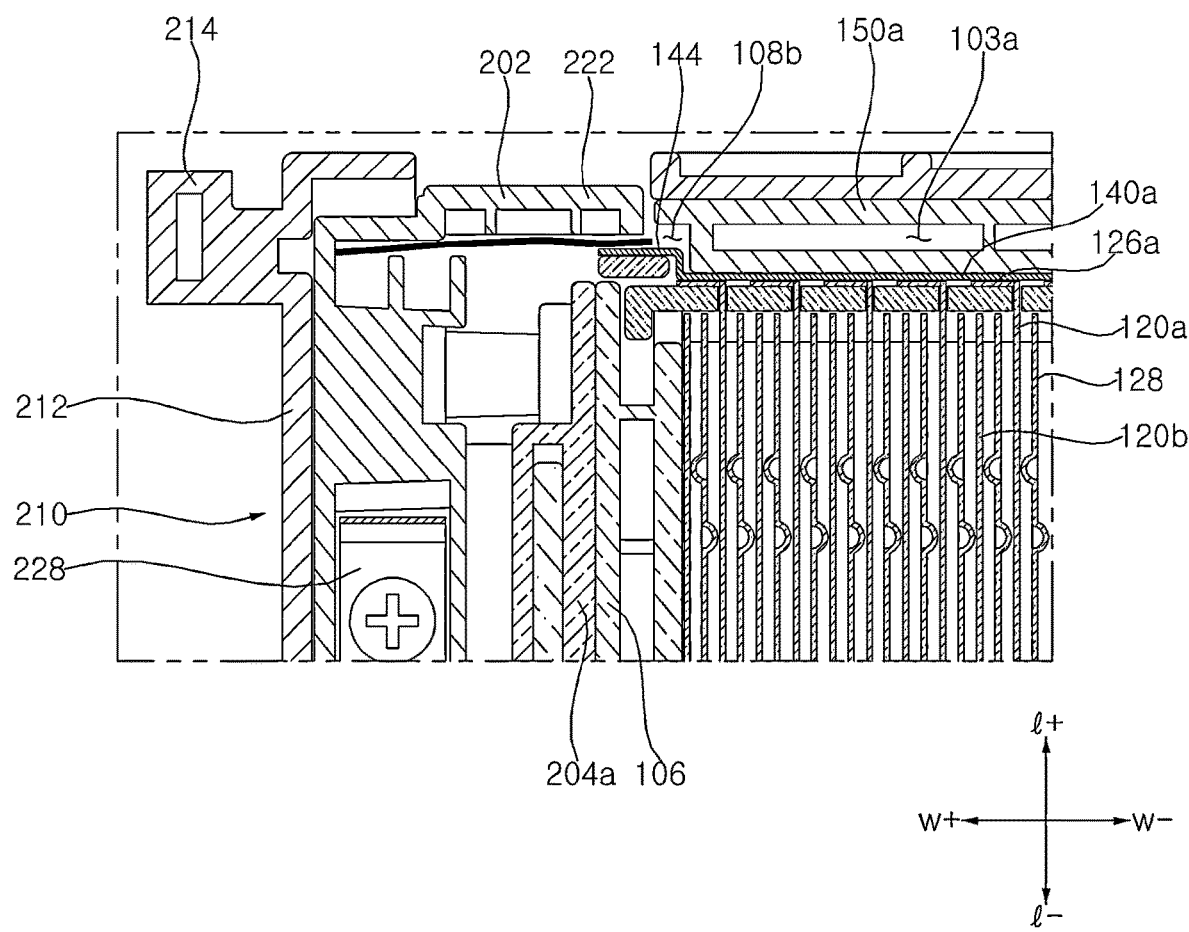
FIG. 24 illustrates an example of a connection relationship between a contact bracket and a first connector with an electrostatic filter and a filter handle being coupled to each other.

When the electrostatic filter 100a, 100b is connected to the filter handle 200a, 200b, the contact bracket 140 may be electrically connected to the first connector 220 of the filter handle 200a, 200b. Referring to FIG. 24, when the second electrostatic filter 100b is connected to the second filter handle 200b, the first contact end portion 144 of the first contact bracket 140a may come into contact with the first connecting plate 222 of the first connector 220 disposed on the second filter handle 200b. Although not shown in the drawings, the second contact end portion 146 of the first contact bracket 140a may come into contact with the second connecting plate 232 of the second connector 230 disposed on the first filter handle 200a.

Figure 25:
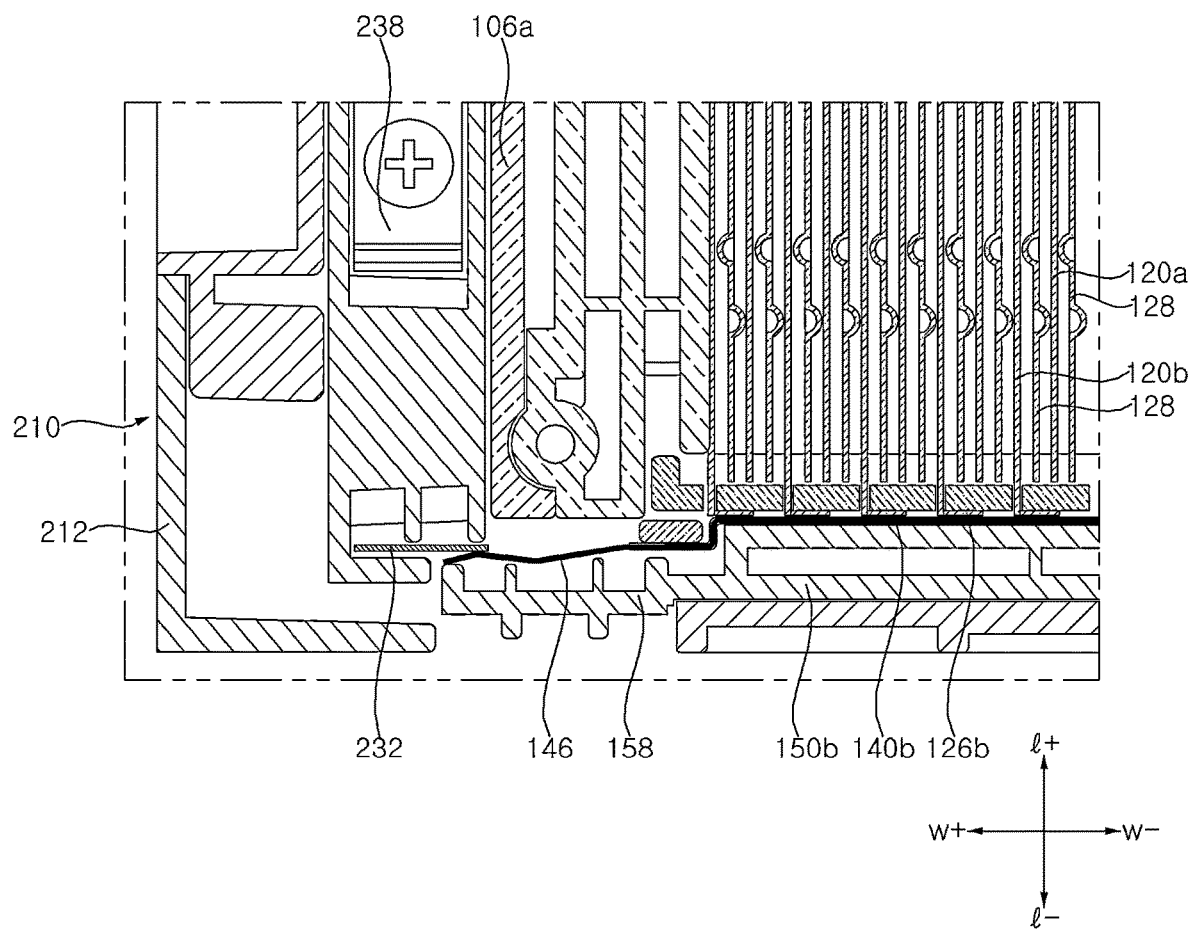
FIG. 25 illustrates an example of a connection relationship between a contact bracket and a second connector with an electrostatic filter and a filter handle being coupled to each other.

Also, referring to FIG. 25, when the second electrostatic filter 100b is connected to the second filter handle 200b, the second contact end portion 146 of the second contact bracket 140b may come into contact with the second connecting plate 232 of the second connector 230 disposed on the second filter handle 200b. Although not shown in the drawings, the first contact end portion 144 of the second contact bracket 140b may come into contact with the first connecting plate 222 of the first connector 220 disposed on the first filter handle 200a.

In addition, when one electrostatic filter 100 and another electrostatic filter 100 are connected to each other, a first contact end portion 144 of a first contact bracket 140a disposed on the one electrostatic filter 100 may come into contact with a second contact end portion 146 of a first contact bracket 140a disposed on the another electrostatic filter 100. That is, when the first electrostatic filter 100a and the second electrostatic filter 100b are connected to each other, the second contact end portion 146 of the second contact bracket 140*b* disposed on the first electrostatic filter 100*a* may come into contact with the first contact end portion 144 of the second contact bracket 140*b* disposed on the second electrostatic filter 100*b*. In addition, when the first electrostatic filter 100*a* and the second electrostatic filter 100*b* are connected to each other, the first contact end portion 144 of the first contact bracket 140*a* disposed on the first electrostatic filter 100*a* may come into contact with the second contact end portion 146 of the first contact bracket 140*a* disposed on the second electrostatic filter 100*b*.

The number of electrostatic filters 100 disposed between the first filter handle 200*a* and the second filter handle 200*b* may vary according to the size of the air conditioner. That is, referring to FIG. 28, one electrostatic filter 100 may be disposed between the first filter handle 200*a* and the second filter handle 200*b*. Alternatively, referring to FIG. 29, three electrostatic filters 100*a*, 100*b*, and 100*c* may be disposed between the first filter handle 200*a* and the second filter handle 200*b*.

Figure 30:
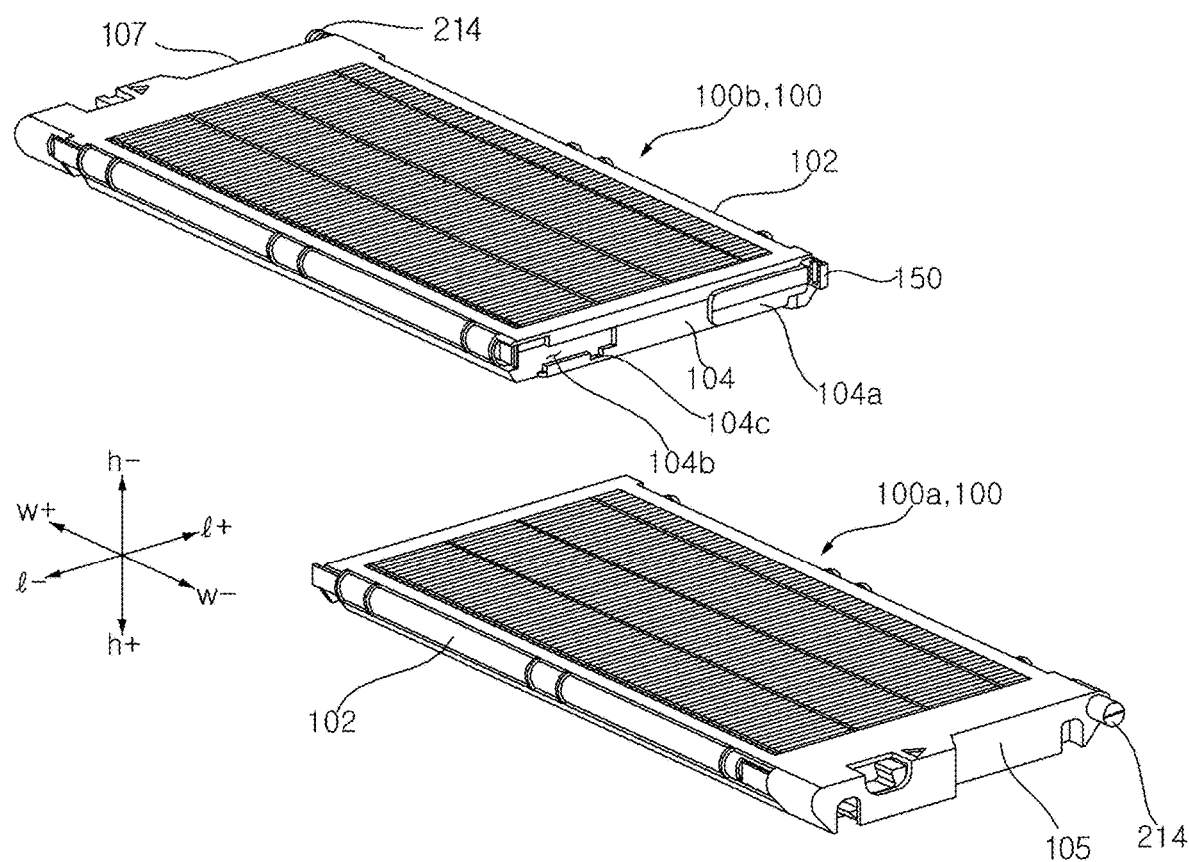
FIG. 30 is an exploded view illustrating an example of an electrostatic dust collector.
Figure 31:
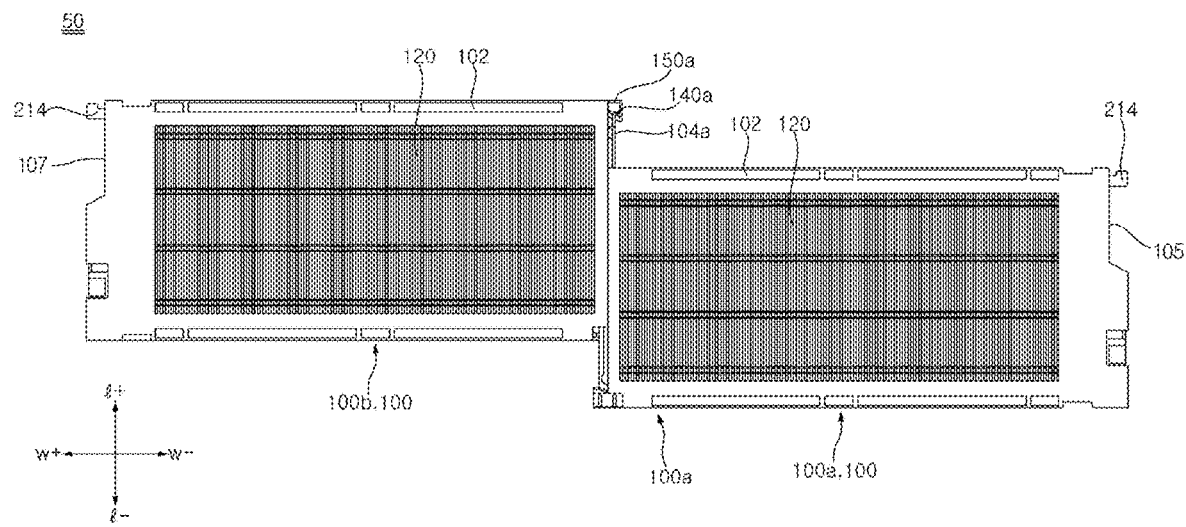
FIG. 31 is a planar view illustrating an example of an electrostatic dust collector.

Referring to FIGS. 30 and 31, the filter handle may be mounted to the electrostatic filter to be configured as one. The electrostatic dust collector 50 includes a first electrostatic filter 100*a* and a second electrostatic filter 100*b*.

The first electrostatic filter 100*a* may be connected to the housing 10 at a first side wall 105. A fixing protrusion 214 engaged with the housing 10 may be disposed on the first side wall 105 of the first electrostatic filter 100*a*.

In addition, the first electrostatic filter 100*a* may be connected to the second electrostatic filter 100*b* at a second side wall 106. A second fastening protrusion (not shown) and a second fastening recess (not shown) are formed on the second side wall 106 of the first electrostatic filter 100*a*. The second fastening protrusion (not shown) and the second fastening recess (not shown) of the second side wall 106 of the first electrostatic filter 100*a* of this embodiment may have the same structure as the structure shown in FIG. 15.

The second electrostatic filter 100*b* may be connected to the housing 10 at a second side wall 107. A fixing protrusion 214 engaged with the housing 10 may be disposed on the second side wall 107 of the second electrostatic filter 100*b*.

In addition, the second electrostatic filter 100*b* may be connected to the first electrostatic filter 100*a* at a first side wall 104. A first fastening protrusion 104*a* and a first fastening recess 104*b* are formed on the first side wall 104 of the second electrostatic filter 100*b*. The first fastening protrusion 104*a* may have a shape corresponding to a second fastening recess. The first fastening recess 104*b* may have a shape corresponding to a second fastening protrusion.

Figure 32:
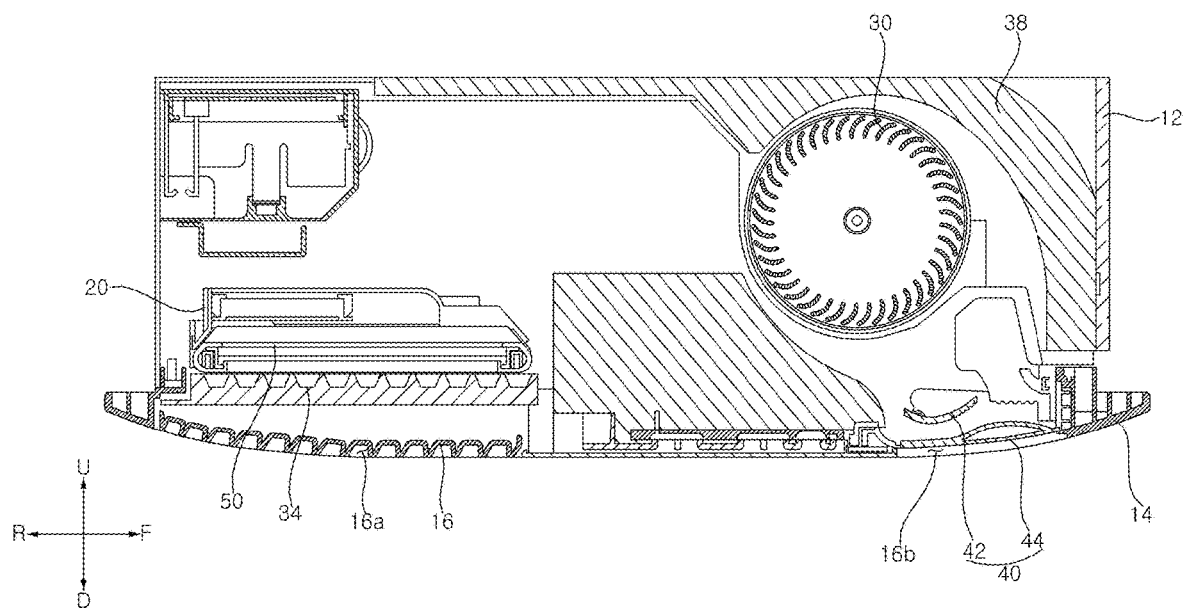
FIG. 32 is a cross-sectional view illustrating an example of an air conditioner.

Referring to FIG. 32, the air conditioner according to another embodiment of the present disclosure may have a structure without a heat exchanger. That is, the air conditioner may be provided therein with a pre-filter 34, an electrostatic dust collector 50, and a fan 30 by which air flows. The electrostatic dust collector 50 may include the structure described above and be mounted inside a housing 10. In addition, a vane 40 for guiding the flow of discharged air may be provided.

Although preferred embodiments of the present disclosure have been shown and described herein, the present disclosure is not limited to the specific embodiments described above. It will be understood that various modifications and changes can be made by those skilled in the art without departing from the idea and scope of the present disclosure as defined by the appended claims.

It is an aspect of the present disclosure to provide an air conditioner including an electrostatic filter that can be manufactured in a simpler manner. It is another aspect of the present disclosure to provide an air conditioner including an electrostatic filter that can allow contact between a plurality of electrostatic films and a contact bracket to be stably maintained. It is yet another aspect of the present disclosure to provide an air conditioner including an electrostatic film that can be stably disposed in a remaining region other than a region in contact with a contact bracket. The aspects of the present disclosure are not limited to the objectives described above, and other objectives not stated herein will be clearly understood by those skilled in the art from the following description.

According to one aspect of the subject matter described in this application, an air conditioner includes: a housing having an inlet on one side thereof and an outlet on another side thereof; a fan disposed in the housing and by which air flows from the inlet to the outlet; a heat exchanger disposed in the housing and configured to exchange heat with air flowing in the housing; and an electrostatic filter disposed in the housing and configured to remove foreign matter from air introduced into the inlet, thereby removing foreign matter from the air introduced into the inlet. The electrostatic filter includes: a plurality of first electrostatic films to which a high voltage is applied; a plurality of second electrostatic films disposed between the plurality of first electrostatic films and to which a lower voltage relative to the plurality of first electrostatic films is applied; a case defining a space in which the plurality of first electrostatic films and the plurality of second electrostatic films are disposed, and having a first contact space to which end portions of the plurality of first electrostatic films are exposed and a second contact space to which end portions of the plurality of second electrostatic films are exposed; and a contact bracket disposed in the first contact space or the second contact space and by which the plurality of first electrostatic films or the plurality of second electrostatic films are electrically connected to each other, allowing the plurality of first electrostatic films to be electrically connected to each other and the plurality of second electrostatic films to be electrically connected to each other. The contact bracket may come into contact with the exposed end portions of the plurality of first electrostatic films or the plurality of second electrostatic films to be slidingly coupled to the case, allowing the plurality of electrostatic films to be electrically connected to each other by using a simple structure.

Each first electrostatic film or each second electrostatic film may include an electrode through which electricity flows and a film to fix a position of the electrode, and the electrode of the each first electrostatic film or the each second electrostatic film may be disposed to be exposed to the first contact space or the second contact space, allowing the contact bracket inserted into the contact space and the plurality of electrostatic films to be electrically connected to each other.

The electrode may include an exposed end portion exposed to an outside of the film. The exposed end portion of the each first electrostatic film may be disposed to protrude to the first contact space, and the exposed end portion of the each second electrostatic film may be disposed to protrude to the second contact space. Accordingly, the exposed end portion may be disposed at a space in which the contact bracket is inserted.

Each exposed end portion may have a predetermined thickness or less to be deformable in shape in a direction in which the contact bracket is inserted. Accordingly, the exposed end portion may come into contact with the contact bracket by being bent when inserted into the contact bracket.

Each exposed end portion may be disposed to be exposed to a position in which the contact bracket is inserted, allowing the exposed end portion and the contact bracket to be in contact with each other. A length of the exposed end portion in an up-and-down direction may be less than a length of the film in the up-and-down direction.

The electrostatic filter may include a first film holder to fix arrangement of the plurality of first electrostatic films and the plurality of second electrostatic films, and a second film holder spaced apart from the first film holder in a front-and-rear direction to fix arrangement of the plurality of first electrostatic films and the plurality of second electrostatic films. The exposed end portion of the each first electrostatic film may be disposed to protrude from the first film holder to the first contact space, and the exposed end portion of the each second electrostatic film may be disposed to protrude from the second film holder to the second contact space, allowing the electrostatic film to be stably disposed in a remaining region other than a region where the electrostatic film and the contact bracket are in contact with each other.

The contact bracket may include: a contact body in contact with the plurality of electrostatic films; a first contact end portion bent from one end portion of the contact body; and a second contact end portion bent from another end portion of the contact body. The contact body may be disposed to be inclined with the plurality of electrostatic films. Accordingly, the electrostatic film and the contact bracket may come into contact with each other upon insertion of the contact bracket.

The case may be provided with an inlet hole in which the contact bracket is inserted and an outlet hole through which part of the contact bracket passes when the contact bracket is mounted to the case. The first contact end portion may be disposed at an outside of the case through the outlet hole, and the second contact end portion may be disposed at the outside of the case through the inlet hole. Accordingly, the contact bracket may be electrically connected to another electrostatic filter or the housing.

The electrostatic filter may further include a bracket holder coupled to the contact bracket to be inserted into the case, allowing the shape of the bracket inserted into the case to be maintained. The bracket holder may include: a holder body disposed on one side of the contact body to support the one side of the contact body; a first separation protrusion disposed on one end portion of the holder body to fix one end portion of the contact bracket; and a holder body disposed on another end portion of the holder body to fix another end portion of the contact bracket, allowing the contact bracket to be securely fixed by the bracket holder.

The first contact end portion may be bent along a perimeter of the first separation protrusion to extend in a direction away from the contact body, and the second contact end portion may be bent along a perimeter of the second separation protrusion to extend in an opposite direction to the first contact end portion. The holder body may include: a first body extending in a longitudinal direction of the case; a second body extending in the longitudinal direction of the case at a position spaced apart from the first body; and a connecting rib disposed between the first body and the second body to connect the first body and the second body, allowing the rigidity of the holder body that supports the contact body to be achieved.

The first separation protrusion may be disposed on one side of the first body in a spaced manner, and the first contact end portion may be disposed between the first protrusion and the first body. The second separation protrusion may be disposed on another side of the first body in a spaced manner, and the second contact end portion may be disposed between the second separation protrusion and the first body. Accordingly, both ends of the contact bracket may be fixed by the first separation protrusion and the second separation protrusion.

The bracket holder may include a holder grip extending from the another end portion of the holder body, and the holder grip may protrude further in an outward direction than the second body to restrict movement of the bracket holder in an insertion direction into the case when the bracket holder is inserted into the case, allowing the bracket holder to be fixedly disposed at the case.

The bracket holder may include a fastening portion extending downward from the holder grip to allow the bracket holder to be fixed to the case. Accordingly, the bracket holder may be fixedly disposed at the case.

Details of other embodiments are included in the detailed description and the accompanying drawings.

An air conditioner according to the present disclosure has one or more of the following aspects. First, as an electrostatic filter includes a contact bracket that is slidingly coupled to a region in which exposed end portions of a plurality of electrostatic films are disposed, the electrostatic filter may be manufactured in a simpler and faster manner. Second, as the exposed end portion of the electrostatic film has a thin thickness to be easily bent, the electrostatic film may be electrically connected to the contact bracket in an easier manner upon insertion of the contact bracket. In addition, one side of the contact bracket includes a bracket holder to fix the position or placement of the contact bracket, allowing the electrostatic film and the contact bracket to be stably connected to each other. Third, as the electrostatic film is fixed by the film holder in a region not in contact with the contact bracket, foreign matter or pollutants may be stably or effectively removed from air. The aspects of the present disclosure are not limited to the effects described above, and other effects not mentioned will be clearly understood by those skilled in the art from the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   a housing
   a fan provided in the housing and configured to generate an air flow; and
   an electrostatic filter provided in the housing and configured to clean air in the housing,
   wherein the electrostatic filter comprises:
      a plurality of first electrostatic films to which a first voltage is applied;
      a plurality of second electrostatic films provided, respectively, between the plurality of first electrostatic films and to which a second voltage is applied, the second voltage being relatively smaller than the first voltage;
      a case defining a space in which the plurality of first electrostatic films and the plurality of second electrostatic films are received, the case having a first contact space in which end portions of the plurality of first electrostatic films are exposed and a second contact space in which end portions of the plurality of second electrostatic films are exposed; and
      a contact bracket provided in the first contact space or the second contact space and electrically connecting the plurality of first electrostatic films or the plurality of second electrostatic films to each other, and
   wherein the contact bracket contacts the end portions of the plurality of first electrostatic films or the end portions of the plurality of second electrostatic films, and the contact bracket is slidingly coupled to the case.

2. The air conditioner of claim 1, wherein each of the first electrostatic film and each second electrostatic film comprises:
   an electrode through which electricity flows; and
   a film to fix a position of the electrode,
   wherein the electrode of each of the first electrostatic films is positioned to be exposed to the first contact space, and
   wherein the electrode of each of the second electrostatic films is positioned to be exposed to the second contact space.

3. The air conditioner of claim 2, wherein the electrode comprises an exposed end portion exposed to an outside of the film,
   wherein the exposed end portion of each of the first electrostatic films is provided in the first contact space, and
   wherein the exposed end portion of each of the second electrostatic films is provided in the second contact space.

4. The air conditioner of claim 3, wherein each exposed end portion has a predetermined thickness or less to be deformable in shape in a direction in which the contact bracket is inserted.

5. The air conditioner of claim 3, wherein each exposed end portion is provided to be exposed to a region in which the contact bracket is inserted.

6. The air conditioner of claim 3, wherein a length of the exposed end portion in an up-and-down direction is less than a length of the film in the up-and-down direction.

7. The air conditioner of claim 3, wherein the electrostatic filter comprises:
   a first film holder to fix the plurality of first electrostatic films and the plurality of second electrostatic films; and
   a second film holder to the plurality of first electrostatic films and the plurality of second electrostatic films, the second film holder being spaced apart from the first film holder in a front-and-rear direction,
   wherein the exposed end portion of each of the first electrostatic films protrudes from the first film holder to the first contact space, and
   wherein the exposed end portion of each of the second electrostatic films protrudes from the second film holder to the second contact space.

8. The air conditioner of claim 1, wherein the contact bracket comprises:
- a contact body in contact with the plurality of first electrostatic films or the plurality of second electrostatic films;
- a first contact end portion bent from a corresponding first end portion of the contact body; and
- a second contact end portion bent from a corresponding second end portion of the contact body, and
- wherein the contact body is inclined with respect to the plurality of first electrostatic films or the plurality of second electrostatic films.

9. The air conditioner of claim 8, wherein the case includes an inlet hole in which the contact bracket is inserted and an outlet hole through which a part of the contact bracket passes when the contact bracket is mounted to the case,
- wherein the first contact end portion of the contact bracket is provided outside of the case through the outlet hole, and
- wherein the second contact end portion of the contact bracket is provided at outside of the case through the inlet hole.

10. The air conditioner of claim 8, wherein the electrostatic filter further comprises a bracket holder coupled to the contact bracket and inserted into the case.

11. The air conditioner of claim 10, wherein the bracket holder comprises:
- a holder body provided on a side of the contact body to support the side of the contact body;
- a first separation protrusion provided on a first end of the holder body to fix a first end of the contact bracket; and
- a second separation protrusion provided on a second end of the holder body to fix a second end of the contact bracket.

12. The air conditioner of claim 11, wherein the first contact end portion of the contact bracket is bent along a perimeter of the first separation protrusion to extend in a first direction away from the contact body, and
- wherein the second contact end portion of the contact bracket is bent along a perimeter of the second separation protrusion to extend in a second direction opposite to the first direction.

13. The air conditioner of claim 11, wherein the holder body comprises:
- a first body extending in a longitudinal direction of the case;
- a second body extending in the longitudinal direction of the case and spaced apart from the first body; and
- a connecting rib provided between the first body and the second body to connect the first body and the second body.

14. The air conditioner of claim 13, wherein the first separation protrusion is spaced apart from a first side of the first body, and the first contact end portion is provided between the first protrusion and the first body, and
- wherein the second separation protrusion is spaced apart from a second side of the first body, and the second contact end portion is provided between the second separation protrusion and the first body.

15. The air conditioner of claim 13, wherein the bracket holder comprises a holder grip extending from the second end of the holder body, and
- wherein the holder grip protrudes further in an outward direction than the second body to restrict movement of the bracket holder in an insertion direction into the case when the bracket holder is inserted into the case.

16. The air conditioner of claim 15, wherein the bracket holder comprises a fastening extension extending downward from the holder grip and configured to fix the bracket holder to the case.

17. The air conditioner of claim 1, further comprising a heat exchanger provided in the housing and configured to exchange heat with air flowing in the housing.

18. The air conditioner of claim 1, wherein the contact bracket is a first contact bracket provided in the first contact space to electrical connect the plurality of first electrostatic films, and
- wherein the electrostatic filter further comprises a second contact bracket provided in the second contact space to electrical connect the plurality of second electrostatic films.

* * * * *